(12) United States Patent
Hurd et al.

(10) Patent No.: US 8,517,136 B2
(45) Date of Patent: Aug. 27, 2013

(54) VEHICLE

(75) Inventors: Chris J. Hurd, Hugo, MN (US); Richard D. Ripley, Rush City, MN (US); Anthony J. Kinsman, Wyoming, MN (US); Matthew S. Kmecik, North Branch, MN (US); Brent A. Erspamer, Blaine, MN (US); Ryan D. Carlson, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 271 days.

(21) Appl. No.: 13/077,490

(22) Filed: Mar. 31, 2011

(65) Prior Publication Data

US 2011/0240394 A1  Oct. 6, 2011

Related U.S. Application Data

(60) Provisional application No. 61/321,439, filed on Apr. 6, 2010.

(51) Int. Cl.
*B60K 17/34* (2006.01)

(52) U.S. Cl.
USPC ............................................. 180/233

(58) Field of Classification Search
USPC .................... 180/233, 292, 364, 90
See application file for complete search history.

(56) References Cited

U.S. PATENT DOCUMENTS

| | | | |
|---|---|---|---|
| 3,210,092 A | 10/1965 | Kraus | |
| 3,990,725 A | 11/1976 | Allison | |
| 5,074,374 A | 12/1991 | Ohtake et al. | |
| 5,669,813 A | 9/1997 | Jairazbhoy et al. | |
| 6,343,237 B1 | 1/2002 | Rossow et al. | |
| 6,414,607 B1 | 7/2002 | Gonring et al. | |
| 6,651,768 B2 | 11/2003 | Fournier et al. | |
| 6,789,812 B2 | 9/2004 | Peterson | |
| 6,942,227 B2 | 9/2005 | Heller et al. | |
| 7,147,078 B2 | 12/2006 | Teslak et al. | |
| 7,571,073 B2 | 8/2009 | Gamberini et al. | |
| 7,575,088 B2 | 8/2009 | Mir et al. | |
| 7,591,472 B2 | 9/2009 | Kinjyo et al. | |
| 7,665,299 B2 | 2/2010 | Schuh et al. | |
| 7,708,103 B2 | 5/2010 | Okuyama et al. | |

(Continued)

FOREIGN PATENT DOCUMENTS

| | | |
|---|---|---|
| DE | 102005013567 | 9/2006 |
| EP | 1384606 | 7/2003 |

(Continued)

OTHER PUBLICATIONS

Bobcat, 2008 Bobcat 2300 4X4—Bed Toys, Four Wheeler Magazine, Feb. 2009, 3 pgs.

(Continued)

*Primary Examiner* — Tashiana Adams
(74) *Attorney, Agent, or Firm* — Faegre Baker Daniels LLP

(57) ABSTRACT

A vehicle is disclosed. The vehicle may include an operator area including side-by-side seating. The vehicle may further include a prime mover and a transmission operatively coupled to at least one ground engaging member of the vehicle. The prime mover may be a diesel engine and the transmission may include a CVT. The prime mover and the transmission may be assembled together and supported by a frame of the vehicle through a plurality of mounts.

18 Claims, 38 Drawing Sheets

(56) References Cited

U.S. PATENT DOCUMENTS

| | | |
|---|---|---|
| 7,819,220 B2 * | 10/2010 | Sunsdahl et al. ............... 180/312 |
| 8,226,155 B2 | 7/2012 | Hill et al. |
| 2004/0217568 A1 | 11/2004 | Gradu |
| 2005/0110228 A1 | 5/2005 | Fujimori |
| 2007/0001417 A1 | 1/2007 | Minoshima |
| 2007/0023221 A1 | 2/2007 | Okuyama et al. |
| 2008/0283324 A1 | 11/2008 | Iwaki et al. |
| 2008/0284124 A1 | 11/2008 | Brady et al. |
| 2009/0302590 A1 | 12/2009 | Van Bronkhorst et al. |
| 2010/0174456 A1 | 7/2010 | Beaudoin et al. |
| 2011/0240250 A1 | 10/2011 | Azuma |
| 2011/0240394 A1 | 10/2011 | Hurd et al. |
| 2012/0031693 A1 | 2/2012 | Deckard et al. |
| 2012/0161427 A1 | 6/2012 | Tsumiyama et al. |
| 2012/0223500 A1 | 9/2012 | Kinsman et al. |
| 2012/0255799 A1 | 10/2012 | Kohler et al. |
| 2012/0299265 A1 | 11/2012 | King |

FOREIGN PATENT DOCUMENTS

| | | |
|---|---|---|
| WO | WO 2008005131 A2 * | 1/2008 |
| WO | WO 2008/125496 | 10/2008 |
| WO | WO 2011/127138 | 4/2012 |

OTHER PUBLICATIONS

Bobcat, 2300 4X4 Utility Vehicle, www.utvguide.net/bobcat_2300_4x4.htm, Oct. 26, 2012, 3 pgs.

Bobcat, Toolcat™ Utility Work Machines brochure, Jan. 2009, 24 pgs.

Bobcat, Utility Vehicle Attachments brochure, Jan. 2008, 4 pgs.

"Ultimate Versatility: New 2300 Utility Vehicle with RapidLink Attachment System", Jun. 1, 2006, 2 pgs.

Bobcat, Utility Vehicles brochure, Feb. 2009, 20 pgs.

International Preliminary Report of Patentability with Article 34 Amendment in PCT/US2011/031376, Oct. 2012, 21 pgs.

Written Opinion of the Searching Authority in PCT/US2011/031376, Oct. 2012, 7 pgs.

International Search Report in PCT/US2011/031376, Feb. 2012, 6 pgs.

Bobcat Service Manual for Utility Vehicle 2200, 2200S, 2300, Feb. 2007, 855 pgs.

* cited by examiner

＃ VEHICLE

RELATED APPLICATIONS

This application claims the benefit of U.S. Provisional Patent Application Ser. No. 61/321,439, titled VEHICLE, the disclosure of which is expressly incorporated by reference herein.

Reference is made to U.S. Provisional Patent Application Ser. No. 61/321,455, filed Apr. 6, 2010, titled VEHICLE WITH HYDRAULIC UNIT, the disclosure of which is expressly incorporated herein by reference.

BACKGROUND AND SUMMARY

The present invention relates to vehicles having side-by-side seating and in particular to vehicles having side-by-side seating and a hydraulic system.

Utility vehicles which have side-by-side seating are known. BOBCAT brand utility vehicles include a hydraulic system having a RAPID LINK brand hydraulic attachment system which couples attachments to a front end of the utility vehicle.

In an exemplary embodiment of the present disclosure, a vehicle is provided. The vehicle comprising a plurality of ground engaging members; a frame supported by the plurality of ground engaging members; an operator area supported by the frame, the operator area including driver controls and seating adapted to support at least two people in a side-by-side relationship; and an assembly supported by the frame. The assembly including a prime mover operatively coupled to at least one of the plurality of ground engaging members to propel the vehicle and a transmission operatively coupled to the prime mover and the at least one of the plurality of ground engaging members to propel the vehicle. The transmission transferring power from the prime mover to the at least one of the plurality of ground engaging members to propel the vehicle. The transmission including a CVT. The vehicle further comprising a plurality of mounts coupled to the frame and supporting the assembly to isolate the assembly relative to the frame. In one example, the plurality of mounts permit a movement of the assembly relative to the frame in a direction normal to a vertical plane passing through a vehicle centerline of the vehicle. In another example, at least a first mount is directly coupled to the prime mover and directly coupled to the frame and at least a second mount is directly coupled to the transmission and directly coupled to the frame, the second mount being spaced apart from the first mount. In yet another example, at least a first mount and a second mount are directly coupled to the prime mover and at least a third mount and a fourth mount are directly coupled to the transmission, a lower portion of the first mount and the second mount being in a first plane and a lower portion of the third mount and the fourth mount being in a second plane, the second plane being offset from the first plane. In a further example, the vehicle further comprises a rear drive unit positioned rearward of the operator area and coupled to a first ground engaging member and a second ground engaging member both positioned rearward of the operator area; a rear drive shaft operatively coupling the rear drive and the CVT, the CVT providing power to the rear drive; wherein at least a third mount and a fourth mount are directly coupled to the transmission and are coupled to the frame at respective positions outboard of the rear drive shaft. In a variation thereof, the vehicle further comprises a front drive unit positioned forward of the operator area and coupled to a third ground engaging member and a fourth ground engaging member both positioned forward of the operator area; and a front drive shaft operatively coupling the front drive and the CVT, the CVT providing power to the front drive, wherein at least a first mount and a second mount are directly coupled to the prime mover and are coupled to the frame at respective positions outboard of the front drive shaft. In still a further example, the vehicle further comprises a damping member coupled to the assembly, the damping member being tuned to reduce the transfer of vibration from the assembly to the frame.

In another exemplary embodiment of the present disclosure, a vehicle is provided. The vehicle comprising a plurality of ground engaging members; a frame supported by the plurality of ground engaging members; an operator area supported by the frame, the operator area including driver controls and seating adapted to support at least two people in a side-by-side relationship; a diesel engine supported by the frame; a gearbox having an input shaft and an output shaft, the input shaft being coupled to the diesel engine to receive power from the diesel engine and a rotation ratio of the output shaft of the gearbox to the input shaft of the gearbox being greater than 1; and a CVT unit having a drive clutch member coupled to the output shaft of the gearbox and a driven clutch member coupled to the drive clutch member, the driven clutch member being operatively coupled to at least one of the plurality of ground engaging members to propel the vehicle. In one example, the rotation ratio of the output shaft of the gearbox to the input shaft of the gearbox is about 2.1. In another example, a speed of the input shaft of the gearbox is in the range of about 3000 rpm to about 3600 rpm and a speed of the output shaft of the gearbox has a corresponding range of about 7200 rpm to about 8000 rpm. In a further example, the vehicle further comprises a rear drive unit positioned rearward of the operator area and coupled to a first ground engaging member and a second ground engaging member both positioned rearward of the operator area; a rear drive shaft operatively coupling the rear drive and the CVT, the CVT providing power to the rear drive; a front drive unit positioned forward of the operator area and coupled to a third ground engaging member and a fourth ground engaging member both positioned forward of the operator area; and a front drive shaft operatively coupling the front drive and the CVT, the CVT providing power to the front drive. In still a further example, the vehicle further comprises a coupling member positioned between the diesel engine and the gearbox, the coupling member transferring power from the diesel engine to the gearbox.

In a further exemplary embodiment of the present disclosure, a vehicle is provided. The vehicle comprising a plurality of ground engaging members; a frame supported by the plurality of ground engaging members; an operator area supported by the frame, the operator area including driver controls and seating adapted to support at least two people in a side-by-side relationship; a diesel engine supported by the frame; and a CVT unit having a drive clutch member coupled to the diesel engine and a driven clutch member coupled to the drive clutch member. The driven clutch member being operatively coupled to at least one of the plurality of ground engaging members to propel the vehicle. The vehicle further comprising an alternator supported by the frame; an output pulley coupled to and rotatable by the diesel engine; and an input pulley coupled to the alternator and coupled to the output pulley. The alternator provides at least about 50% charging capacity when the diesel engine is at idle and about 100% charging capacity when diesel engine is operating at about 50% engine capacity. In one example, the vehicle further comprising a rear drive unit positioned rearward of the operator area and coupled to a first ground engaging member and a second ground engaging member both positioned rearward of the operator area; a rear drive shaft operatively coupling the rear drive and the CVT, the CVT providing power to the rear drive; a front drive unit positioned forward of the operator area and coupled to a third ground engaging member and a fourth ground engaging member both positioned forward of the operator area; and a front drive shaft operatively coupling the front drive and the CVT, the CVT providing power to the front drive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Unless stated otherwise the drawings are proportional.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts. Further, although described in the context of a diesel powered vehicle, the embodiments disclosed herein may be implemented as part of a hybrid vehicle, a gasoline powered vehicle, any other suitable type of internal combustion powered vehicle, or an electric vehicle.

Figure 1:
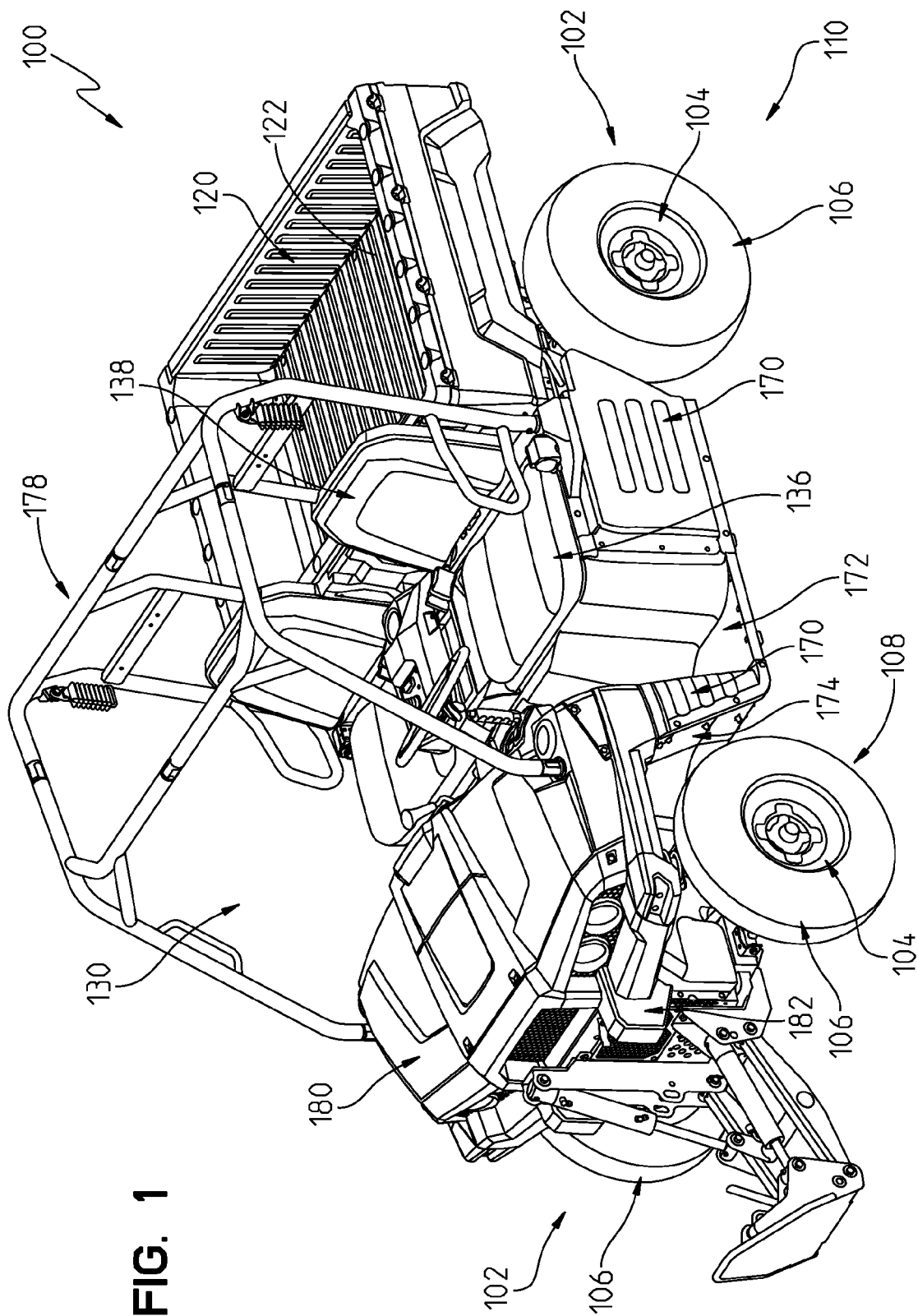
FIG. 1 illustrates a perspective view of an exemplary utility vehicle.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In addition to vehicle 100, the teachings of the present disclosure may be used in combination with the suspension systems, drive configurations, modular sub-sections, power steering units, and other features described in any one of U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser.

No. 60/918,356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. Utility patent application Ser. No. 12/050,048, titled VEHICLE WITH SPACE UTILIZATION, filed Mar. 17, 2008; U.S. Utility patent application Ser. No. 12/050,064, titled VEHICLE WITH SPACE UTILIZATION, filed Mar. 17, 2008; U.S. Utility patent application Ser. No. 12/050,041, titled METHOD AND APPARATUS RELATED TO TRANSPORTABILITY OF A VEHICLE filed Mar. 17, 2008; U.S. Utility patent application Ser. No. 12/092,151, titled UTILITY VEHICLE HAVING MODULAR COMPONENTS, filed Apr. 30, 2008; U.S. Utility patent application Ser. No. 12/092,153, titled VEHICLE, filed Apr. 30, 2008, U.S. Utility patent application Ser. No. 12/092,191, titled VEHICLE, filed Apr. 30, 2008, U.S. Utility patent application Ser. No. 12/135,107, titled VEHICLE, filed Jun. 6, 2008, U.S. Utility patent application Ser. No. 12/134,909, titled SUSPENSION SYSTEMS FOR A VEHICLE, filed Jun. 6, 2008, U.S. Utility patent application Ser. No. 12/218,572, titled FLOORBOARD FOR A VEHICLE, filed Jul. 16, 2008, U.S. Utility patent application Ser. No. 12/317,298, titled VEHICLE, filed Dec. 22, 2008, U.S. Utility patent application Ser. No. 12/484,921, titled ELECTRIC VEHICLE, filed Jun. 15, 2009, and U.S. Provisional Patent Application Ser. No. 61/187,147, titled ELECTRIC VEHICLE, filed Jun. 15, 2009, the disclosures of which are expressly incorporated by reference herein.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle. As mentioned herein one or more of ground engaging members 102 are operatively coupled to a drivetrain 112 (see FIG. 20) to power the movement of vehicle 100.

Returning to FIG. 1, vehicle 100 includes a bed 120 having a cargo carrying surface 122. Cargo carrying surface 122 may be flat, contoured, and/or comprised of several sections. Bed 120 further includes a plurality of mounts 124 (one indicated) for receiving an expansion retainer (not shown) which may couple various accessories to bed 120. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein.

Vehicle 100 includes an operator area 130 including seating 132 for one or more passengers. Operator area 130 further includes a plurality of operator controls 134 by which an operator may provide input into the control of vehicle 100. Controls 134 may include controls for steering, shifting gears, acceleration, and braking. Seating 132 includes a seat bottom portion 136 and a seat back portion 138 and head rests (not shown). Seating 132 is shown as bucket seats 140 and 142 with a console portion 144 therebetween. As shown herein, the operator area 130 only includes seating for individuals in a first row. In one embodiment, operator area is configured such that seating 132 includes multiple rows of seating.

Figure 28:
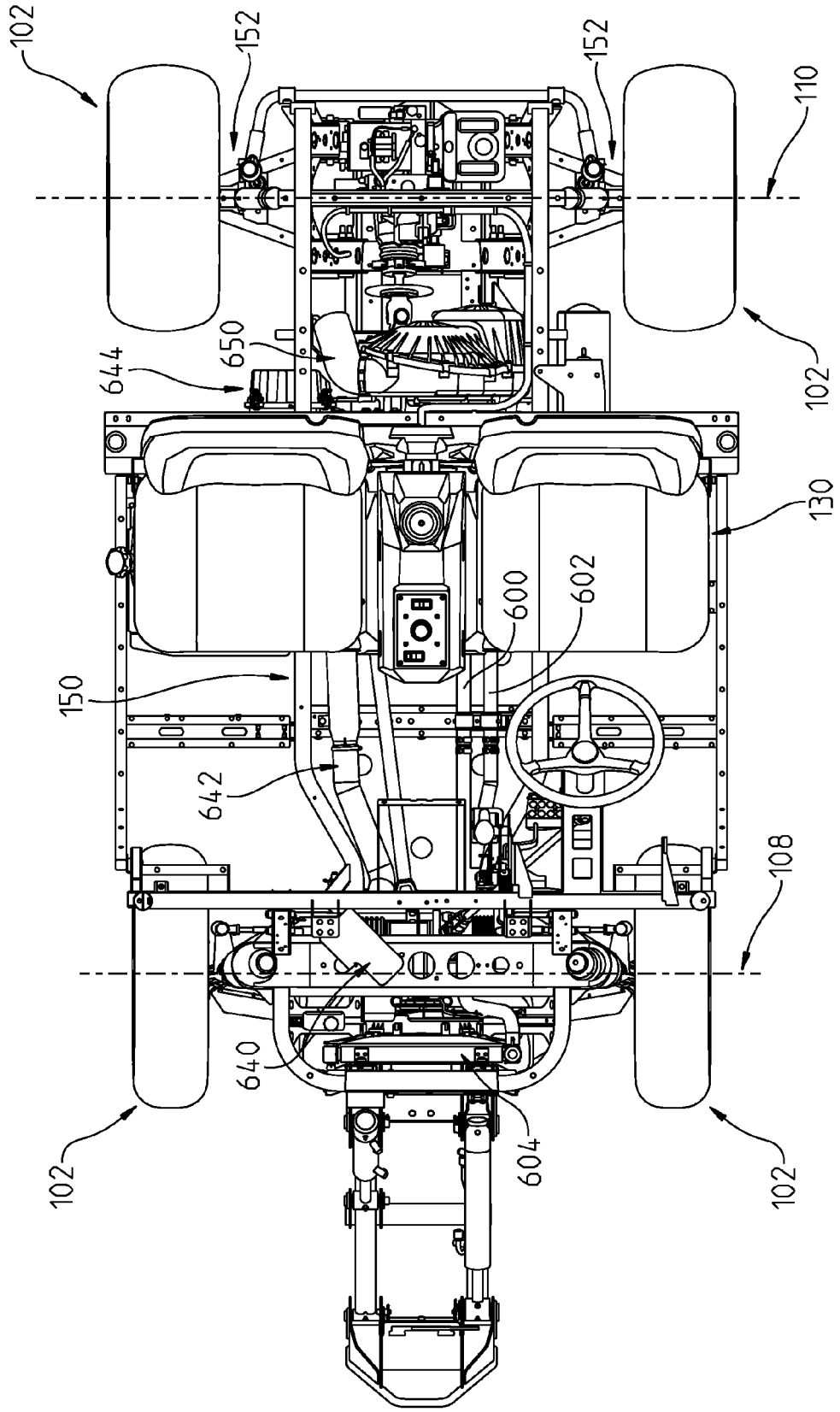
FIG. 28 illustrates a top view of the exemplary vehicle of FIG. 1 with the body panels, cargo bed, and roll cage removed.

Vehicle 100 includes four wheel independent suspensions. Referring to FIG. 28, each of ground engaging members 102 of rear axle 110 is coupled to frame 150 (FIG. 8A) through a rear suspension 152. In one embodiment, each of the ground engaging members of the rear axle are coupled to a rear drive unit through a half shaft. Each of ground engaging members 102 of front axle 108 is coupled to frame 150 through a front suspension 160. In one embodiment, each of the ground engaging members of the rear axle are coupled to a rear drive unit through a half shaft. In one embodiment, the rear drive unit 730 is offset from the vehicle centerline and the half shafts to the rear ground engaging members are of unequal length.

Figure 8:
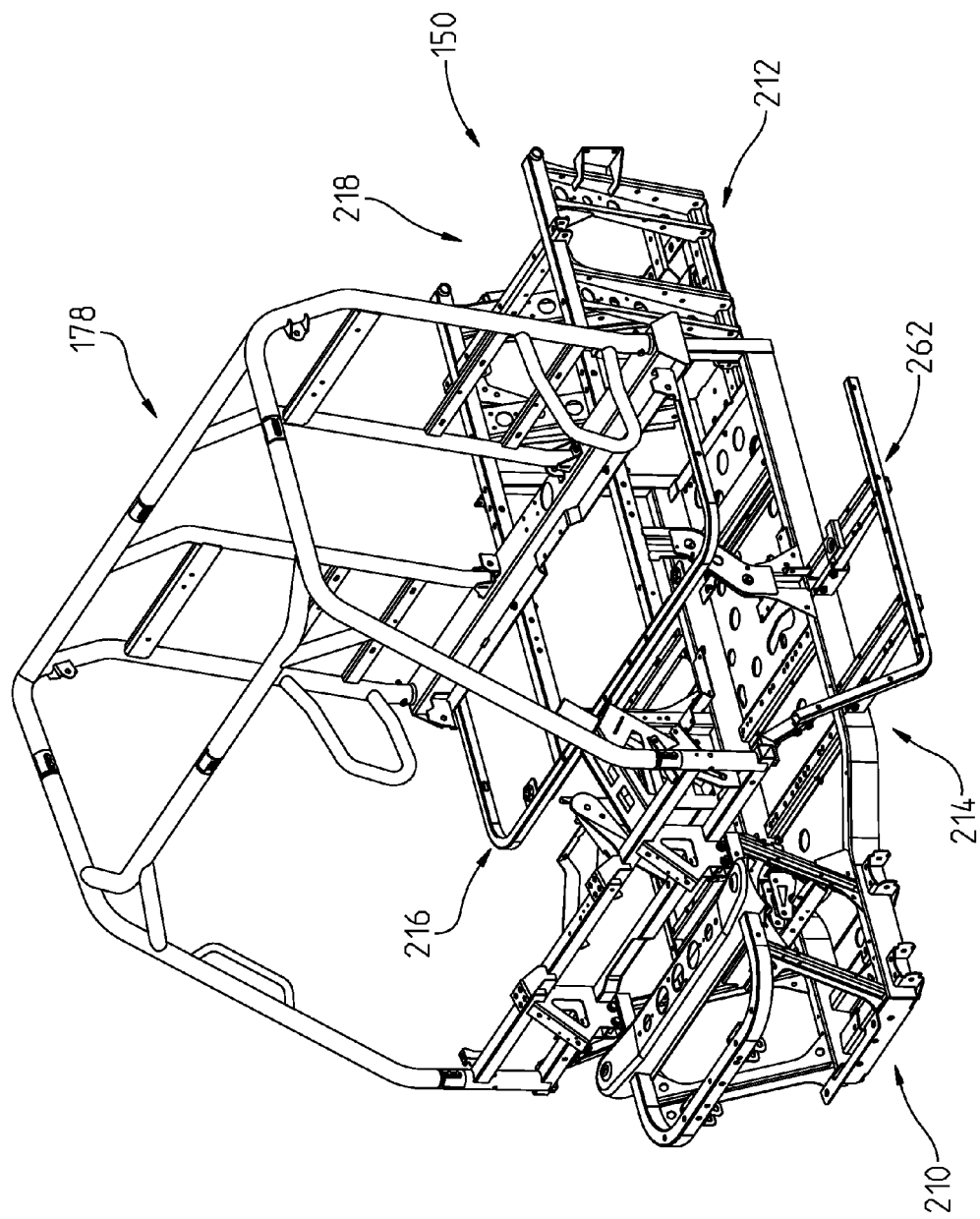
FIG. 8 illustrates a perspective view of a chassis of the exemplary utility vehicle.

In addition to the bed 120, utility vehicle includes a plurality of body components, and as best shown in FIGS. 1-6, namely side panels 170, floor boards 172, wheel wells 174, dash 176, rollover structure 178, hood 180, and bumper 182. All of these items are directly or indirectly attached to and/or supported by the vehicle frame 150 (see FIG. 8).

With reference to FIGS. 8-14, frame 150 supports rollover structure 178. Frame 150 includes a front frame portion 210, a rear frame portion 212 and an intermediate frame portion 214. The frame portions 210, 212, 214 provide support to drivetrain 112. The wheels 104 of front axle 108 are coupled to front frame portion 210 of frame 150 and support front frame portion 210 of frame 150 above the ground. Intermediate frame portion 214 includes a seat support portion 216. The wheels 104 of rear axle 110 are coupled to rear frame portion 212 of frame 150 and support rear frame portion 212 of frame 150 above the ground. Rear frame portion 212 of frame 150 further includes a bed support portion 218.

Figure 8A:
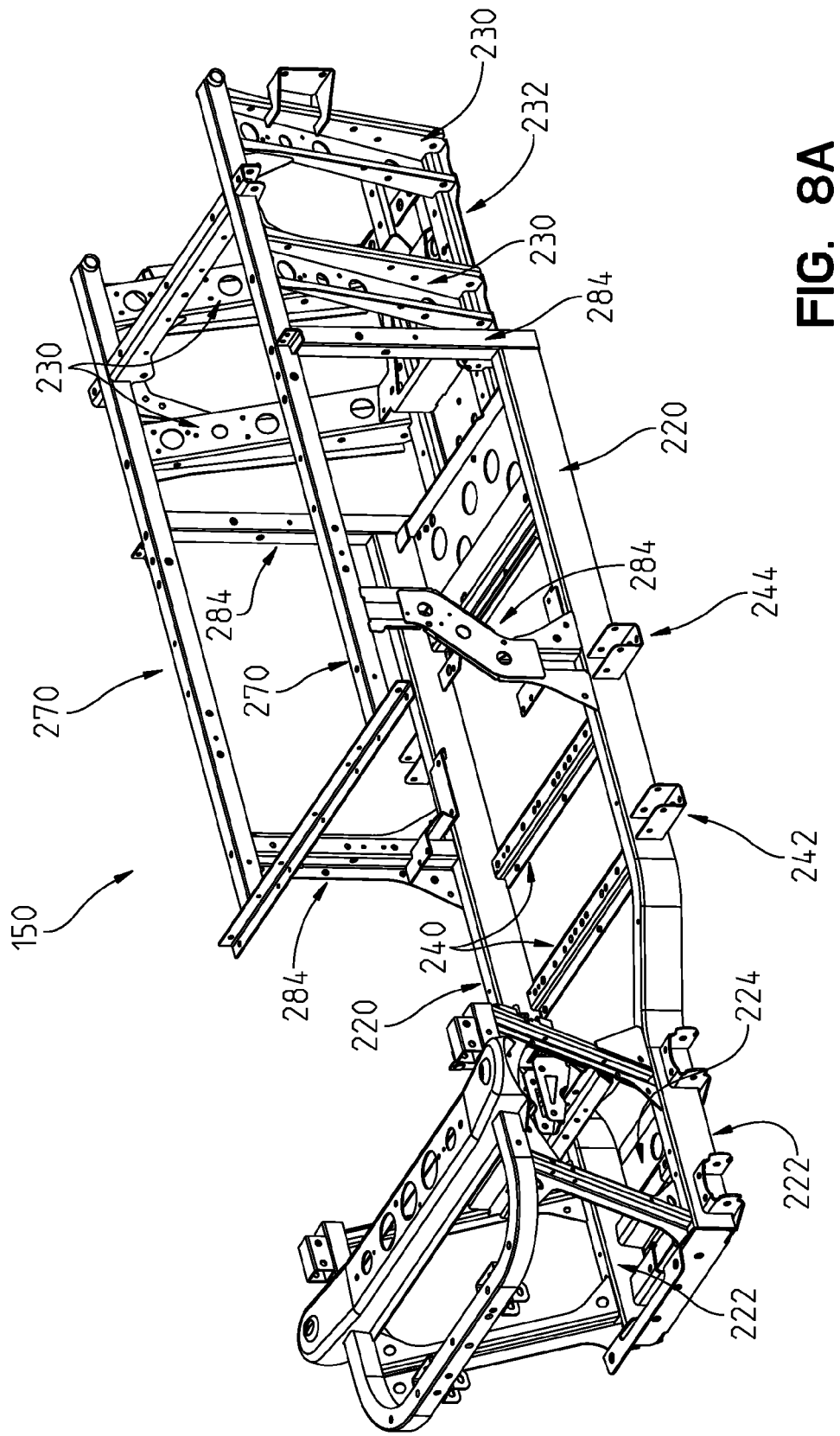
FIG. 8A illustrates an upper, perspective view of a frame of the chassis of FIG. 8.
Figure 8B:
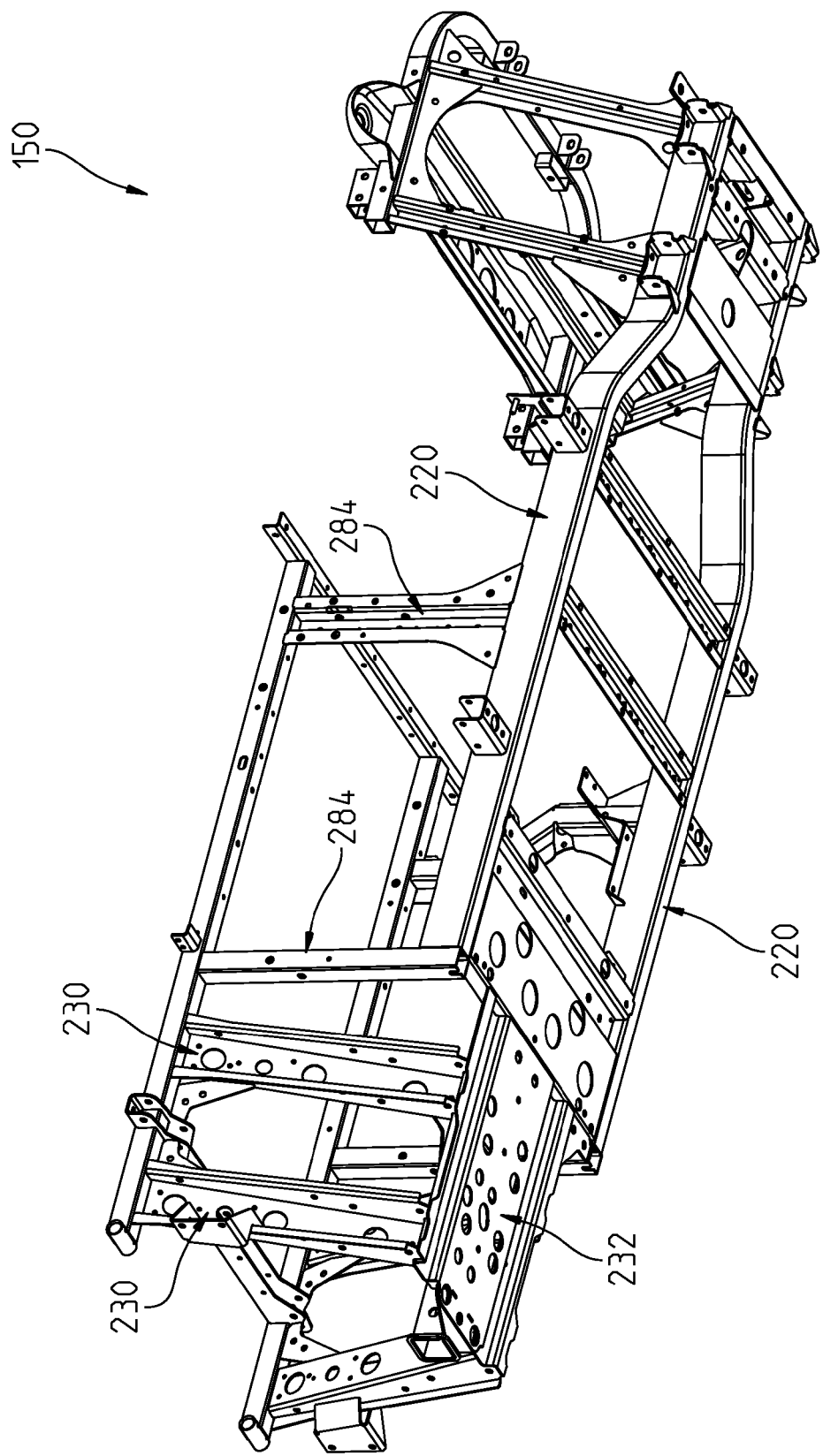
FIG. 8B illustrates a lower, perspective view of the frame of the chassis of FIG. 8.

With respect to FIG. 8A, frame 150 will be described. Frame 150 includes longitudinally extending frame members 220 which extend a substantial length of the vehicle and neck down to form front frame members at 222. Support plates 224 and 226 span the frame members 222. Rear frame portion 212 is defined by channel members 230 extending from a transverse portion 232.

Intermediate frame portion 214 is comprised of transverse channels 240 extending between longitudinally extending frame members 220 and transverse channel portions 242 and 244 extending outwardly from longitudinally extending frame members 220. Frame tube 262 (see FIG. 8) is positioned at the end of transverse channel portions 242 and frame tube 264 is positioned at the end of transverse channel portions 244.

With respect again to FIG. 8 and FIG. 22, seat support platform 216 is supported by upper frame members 270 which are elevated from the longitudinal extending support members 220 by way of vertical support members 284.

Figure 15:
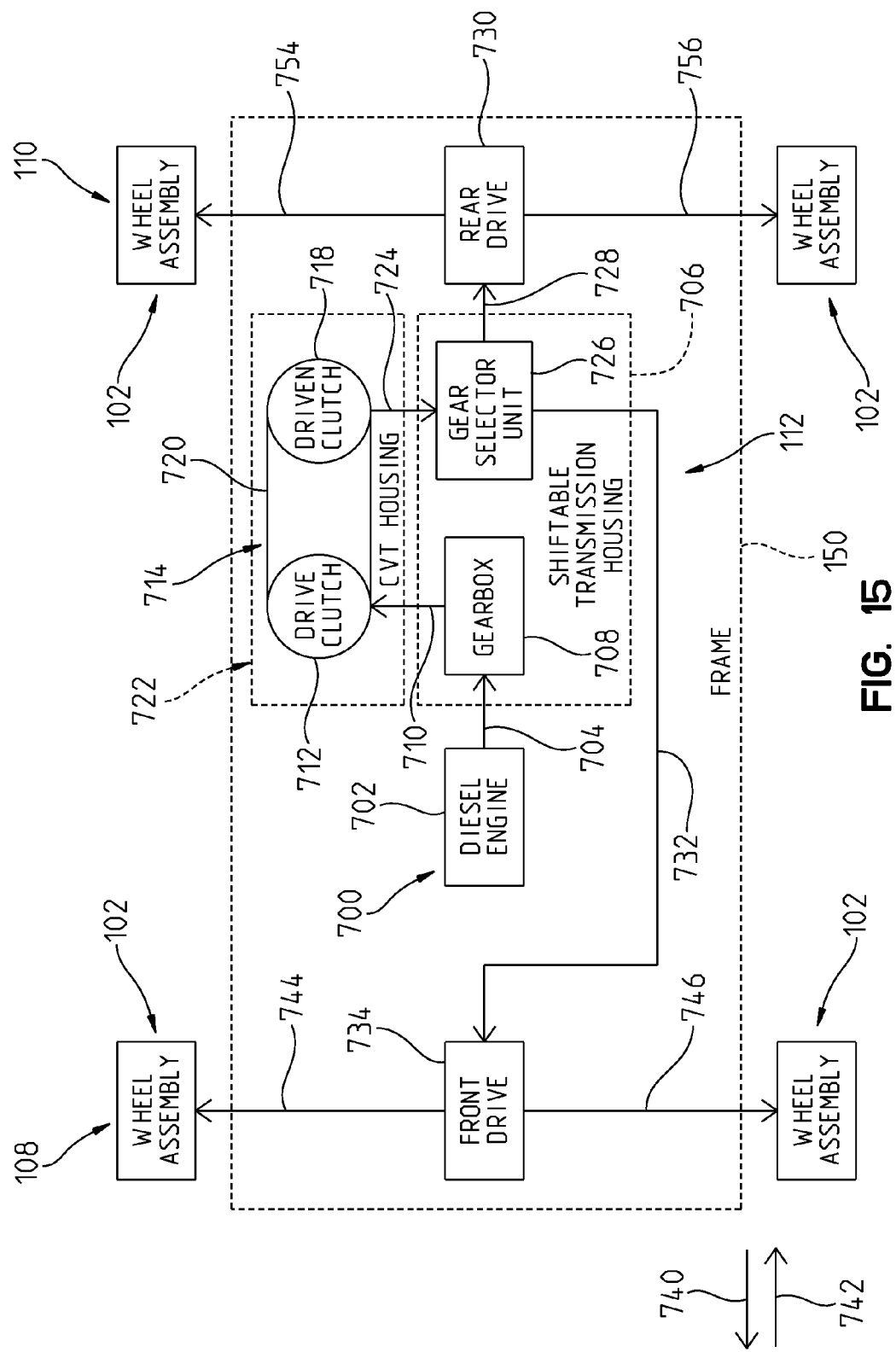
FIG. 15 illustrates a representative view of an drivetrain system.
Figure 16:
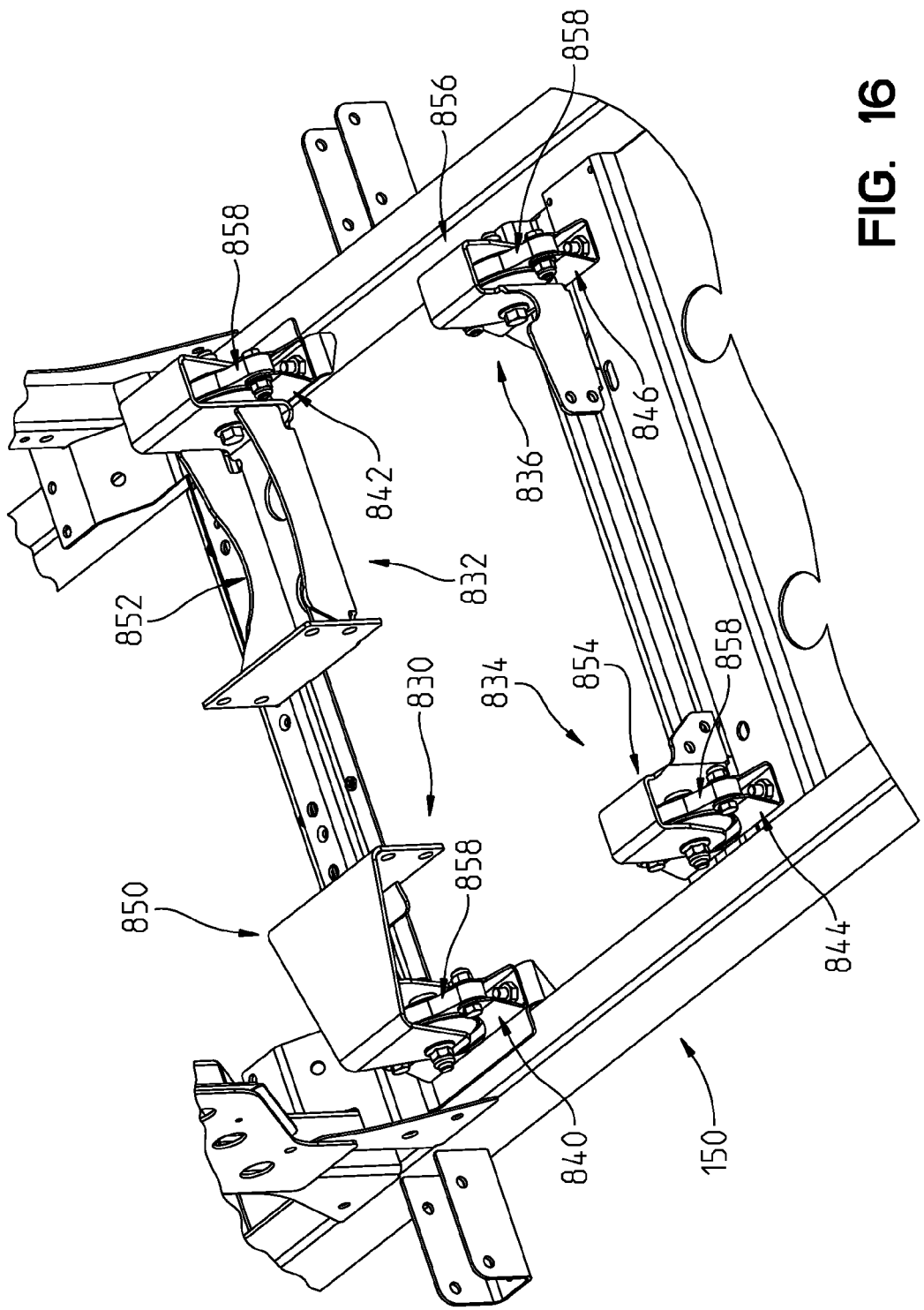
FIG. 16 illustrates a plurality of mounts for the engine and transmission of the drivetrain of FIG. 15.

Referring to FIG. 15, an exemplary drivetrain system 112 is represented. A prime mover 700 is shown. In the illustrated embodiment, prime mover 700 is a diesel engine 702. Other exemplary prime movers include gasoline engines, other suitable internal combustion engines, an electric motor, a hybrid system including both an internal combustion engine and an electric motor, a fuel cell, and any other suitable device for providing a source of power.

Figure 29:
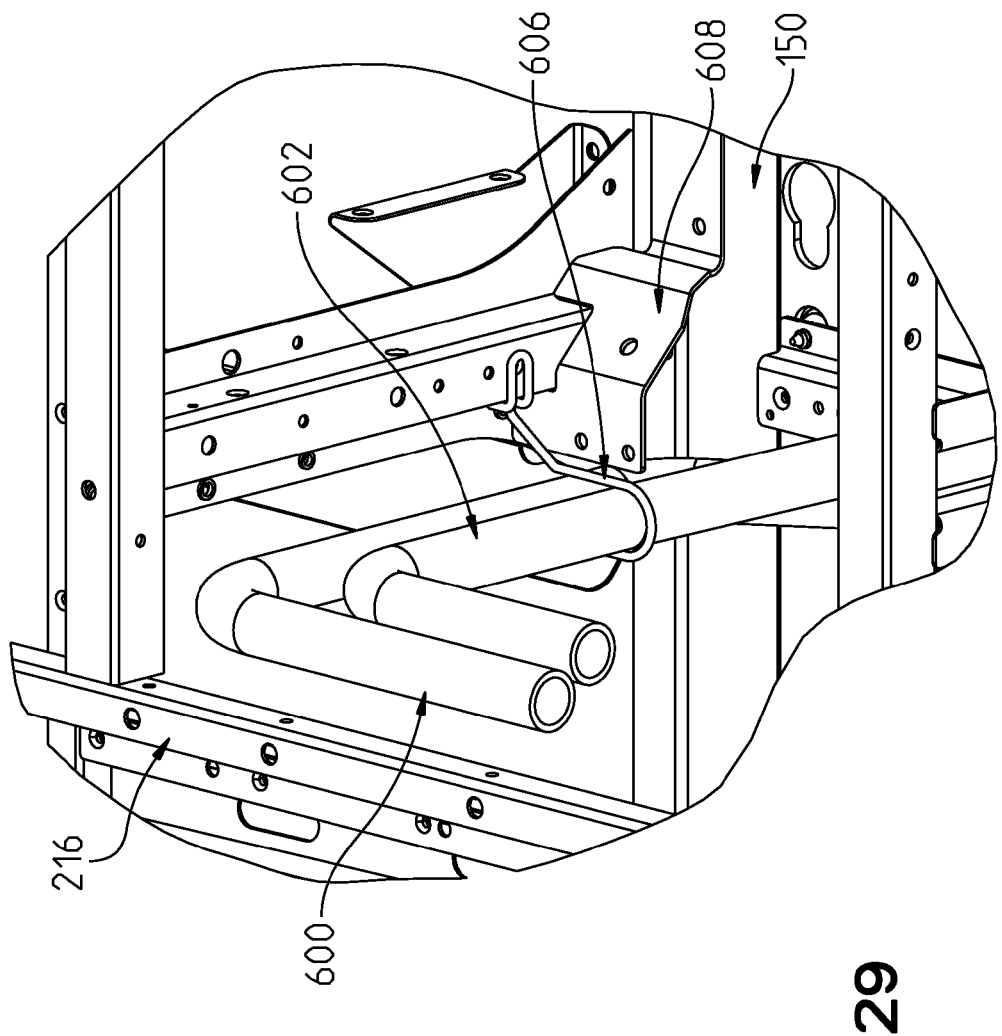
FIG. 29 illustrates a cooling hose restraint.

In one embodiment, diesel engine 702 is a liquid cooled engine. Referring to FIG. 28, coolant lines 600 and 602 carry coolant between diesel engine 702 (under seating 130) and a radiator 604 positioned forward of front axle 108. Coolant lines 600 and 602 are located on top of the skid plate of frame 150. Referring to FIG. 29, underneath seating 130, the coolant lines 600 and 602 are vertically oriented to transition from the skid plate up to diesel engine 702. Retaining member 606 is provided to generally maintain coolant lines 600 and 602 spaced apart from portions of frame 150, such as portion 608.

An output shaft 704 of diesel engine 702 is operatively coupled to a gearbox 708. In the illustrated embodiment, the gearbox 708 is positioned within a housing 706 of a shiftable transmission. Gearbox 708 has an output shaft 710 which is operatively coupled to a drive clutch 712 of a continuously variable transmission ("CVT") 714. In one embodiment, gearbox 708 is configured so that output shaft 710 rotates at a higher number of revolutions per minute ("rpm") than output shaft 704. In one embodiment, gearbox 708 is configured so that output shaft 710 rotates at a lower number of revolutions per minute than output shaft 704. In one embodiment, the ratio of revolutions per minute of output shaft 710 to output shaft 704 is 1.15 to 1. In one example, this results in vehicle 100 having a top speed of about 30 miles per hour when output shaft 704 is revolving at about 3000 rpm. Of course, the speed of vehicle 100 may be influenced by many other factors including the tuning of CVT 714, the gearing of gear selector unit 726, and the gearing of the front and rear drive units 734 and 730.

In one embodiment, the ratio of revolutions per minute of output shaft 710 to output shaft 704 is about 2.1 to 1. In one example, this results in vehicle 100 having a top speed of about 50 miles per hour when output shaft 704 is revolving at about 3000 rpm. An exemplary arrangement for altering the rpm of output shaft 710 is shown in U.S. patent application Ser. No. 12/069,521, the disclosure of which is expressly incorporated by reference herein, wherein the rpm of an output shaft which connects to a drive clutch of a CVT is altered from the rpm of an input shaft connected to an engine through a set of gears. The gearbox 708 includes a plurality of gears which cause output shaft 710 to rotate at a rate greater than the rotation rate of the input shaft 898 of gearbox 708. In one embodiment, diesel engine 702 is governed at about 3000 to about 3600 rpm and gearbox 708 is configured to drive clutch 712 at about 7200 to about 8000 rpm.

Drive clutch 712 is coupled to a driven clutch 718 through a belt 720. The drive clutch 712, driven clutch 718, and belt 720 are housed in a CVT housing 722. In one embodiment, drive clutch 712 and driven clutch 718 correspond to the drive clutch and driven clutch disclosed in U.S. patent application Ser. No. 12/069,521, the disclosure of which is expressly incorporated by reference herein. One or both of drive clutch 712 and driven clutch 718 includes impellers which direct airflow within CVT housing 722 to cool at least belt 720. Additional details of continuously variable transmissions are provided in U.S. Pat. No. 6,149,540 and U.S. Pat. No. 7,163,477, the disclosures of which are expressly incorporated by reference herein.

In one embodiment, CVT housing 722 is a sealed housing. CVT housing 722 seals against the shiftable transmission housing 706 to seal an interior of CVT housing 722. By including the gearbox 708 and gear selector unit 726 in a common housing, or otherwise in a fixed relationship, a distance between the input of the gear selector unit and the output shaft of the gearbox may be maintained, even if the assembly of diesel engine 702 and transmission housing 706 is vibrating. This in turn maintains the spacing of the rotation axis of the drive clutch member 712 of CVT 714 and the driven clutch member 718 of CVT 714. In the illustrated embodiment, transmission housing 706 is positioned rearward of diesel engine 702 and CVT 714 is positioned rearward of transmission housing 706.

Driven clutch 718 is operatively coupled to an output shaft 724 which is coupled to a gear selector unit 726. Gear selector unit 726 includes gearing which is coupled to a first output shaft 728 which is operatively coupled to a rear drive unit 730 and a second output shaft 732 which is operatively coupled to a front drive unit 734. The gearing of gear selector unit 726 permits the selection of at least one forward gear which causes vehicle 100 to be propelled in direction 740 and at least one reverse gear which causes vehicle 100 to be propelled in direction 742. In one embodiment, at least two forward gears are provided (low and high), a first reverse gear, and a neutral position. Although, gear selector unit 726 is represented as having both first output shaft 728 and second output shaft 732, in one embodiment, gear selector unit 726 only includes one of first output shaft 728 and second output shaft 732 and the corresponding rear drive unit 730 and front drive unit 734 is removed.

Front drive unit 734 has two output shafts 744 and 746, each of which couples front drive unit 734 to one of ground engaging member 102 of front axle 108. Output shafts 744 and 746 generally power the respective ground engaging member 102 with the power generated by diesel engine 702. In one embodiment, front drive unit 734 is a lockable differential which may be locked to provide power to both of output shafts 744 and 746 or unlocked to provide power to only one of output shafts 744 and 746 or neither of output shafts 744 and 746. Exemplary front drive configurations are disclosed in U.S. Provisional Patent Application Ser. No. 61/187,147, the disclosure of which is expressly incorporated by reference herein.

In one embodiment, front drive unit 734 is an automatic locking front differential manufactured by Hilliard Corporation of Elmira, N.Y., and has an overrunning clutch. Exemplary overrunning clutches are disclosed in U.S. Pat. No. RE38,012E, the subject matter of which is incorporated herein by reference. In one embodiment, front drive unit 734 operates under the principle described in U.S. Pat. No. 5,036,939, the subject matter of which is incorporated herein by reference. In one embodiment, front drive unit 734 is designed to engage when the wheel slippage is in the range of 10-30%. In one embodiment, front drive unit 734 is a Model No. 1332670 available from Polaris Industries Inc. of Medina Minn. In one embodiment, front drive unit 734 which includes active descent control and is available from Polaris Industries Inc. of Medina Minn.

Rear drive unit 730 has two output shafts 754 and 756, each of which couples rear drive unit 730 to one of ground engaging member 102 of rear axle 110. Output shafts 754 and 756 generally power the respective ground engaging member 102 with the power generated by diesel engine 702. In one embodiment, rear drive unit 730 is a lockable differential which may be locked to provide power to both of output shafts 754 and 756 or unlocked to provide power to only one of output shafts 754 and 756 or neither of output shafts 754 and 756.

Figure 20:
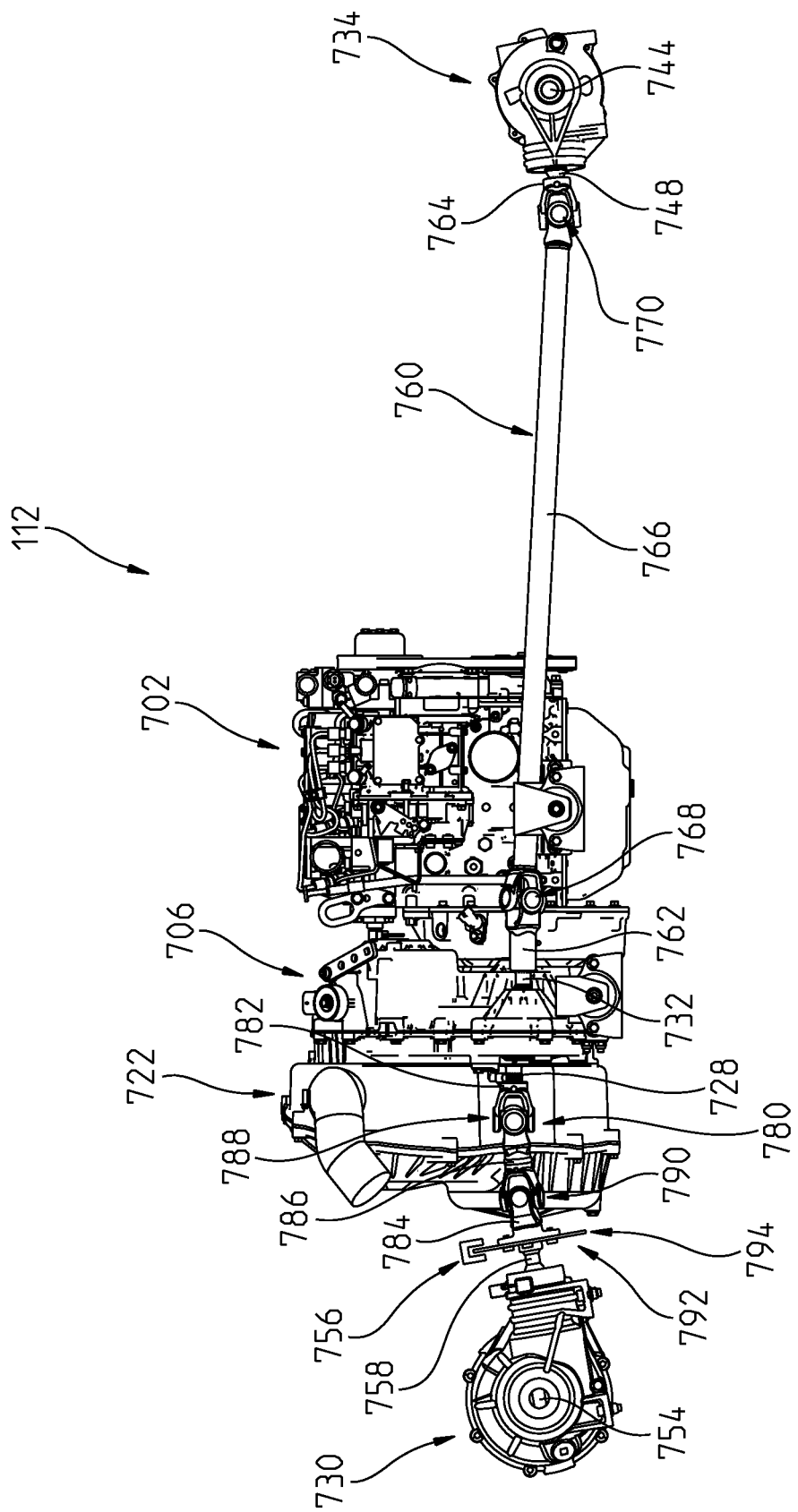
FIG. 20 illustrates an exemplary drivetrain system.

Referring to FIG. 20, an exemplary representation of drivetrain 112 is shown. In FIG. 20, diesel engine 702, shiftable transmission housing 706, CVT housing 722, rear drive unit 730, and front drive unit 734 are shown in the positions they occupy when supported by frame 150. Second output shaft 732 of gear selector unit 726 is coupled to an input shaft 748 of front drive unit 734 through a prop shaft 760. prop shaft 760 includes a first portion 762 coupled to second output shaft 732, a second portion 764 coupled to input shaft 748, and a third portion 766 coupled to first portion 762 and second portion 764 through universal joint 768 and universal joint 770, respectively. As shown in FIG. 20, prop shaft 760 generally tilts downward as it runs from second output shaft 732 towards front drive unit 734. In a similar fashion, first output shaft 728 of gear selector unit 726 is coupled to an input shaft 758 of rear drive unit 730 through a prop shaft 780. Prop shaft 780 includes a first portion 782 coupled to first output shaft 728, a second portion 784 coupled to input shaft 758, and a third portion 786 coupled to first portion 782 and second portion 784 through universal joint 788 and universal joint 790, respectively. As shown in FIG. 20, prop shaft portion 784 generally tilts downward as it runs from first output shaft 728 towards rear drive unit 730. In one embodiment, rear drive unit 730 is angled upwards by about 10 degrees.

Prop shaft 780 further carries a parking brake 792. A disc 794 of parking brake 792 is coupled to second portion 784 of prop shaft 780. A caliper 796 is supported by frame 150 and actuatable by an operator input 798 (see FIG. 2) to either engage disc 794 or not.

Figure 30:
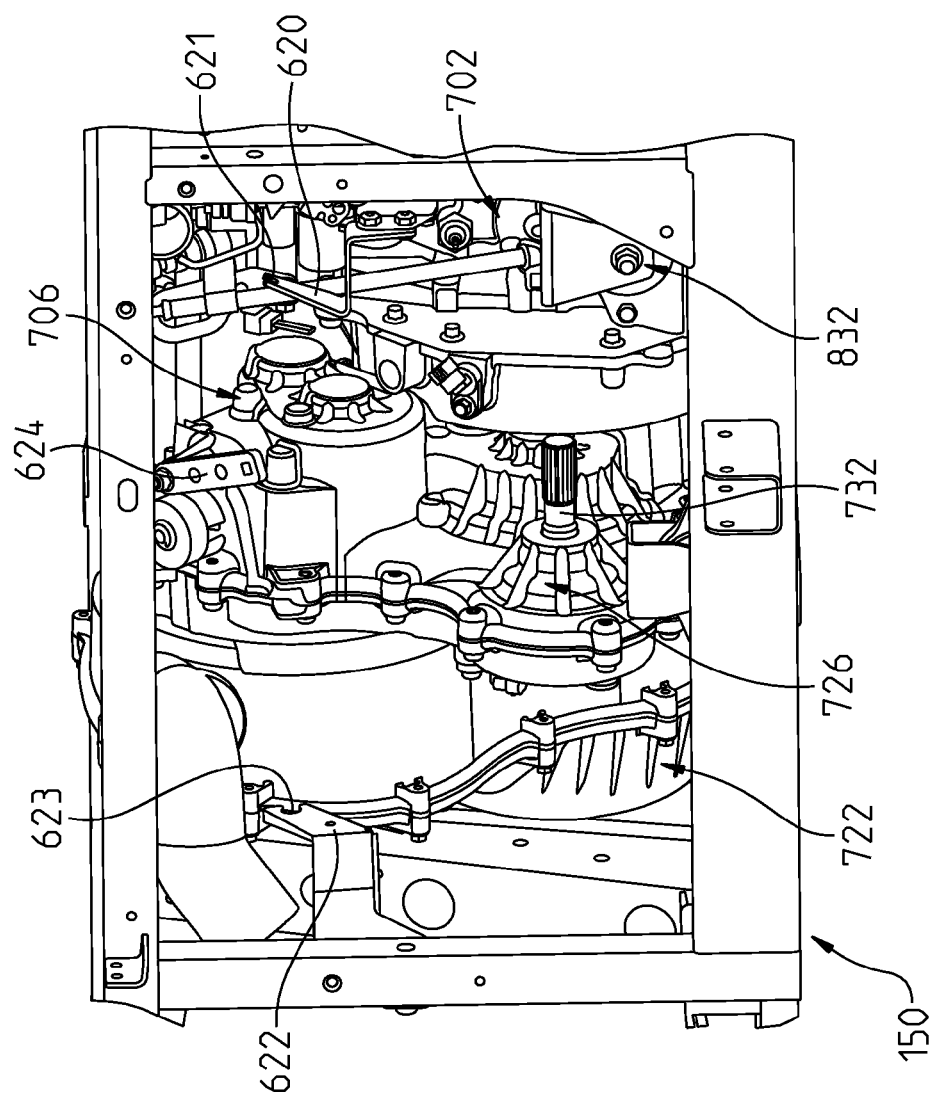
FIG. 30 illustrates the location of a throttle control cable bracket and a gear selector cable bracket.

Referring to FIG. 30, a first bracket 620 is coupled to diesel engine 702. Bracket 620 includes a recess 621 which receives a throttle cable which is operatively coupled to the engine 702 and to a throttle input in operator area 130. A second bracket 622 is coupled to frame 150. Bracket 622 also includes a recess which receives a gear selector cable which is operatively coupled to a gear selector input in operator area 130. The gear selector cable is also operatively coupled to a link 624 which may be actuated to select a respective gear in gear selector unit 726.

Figure 26:
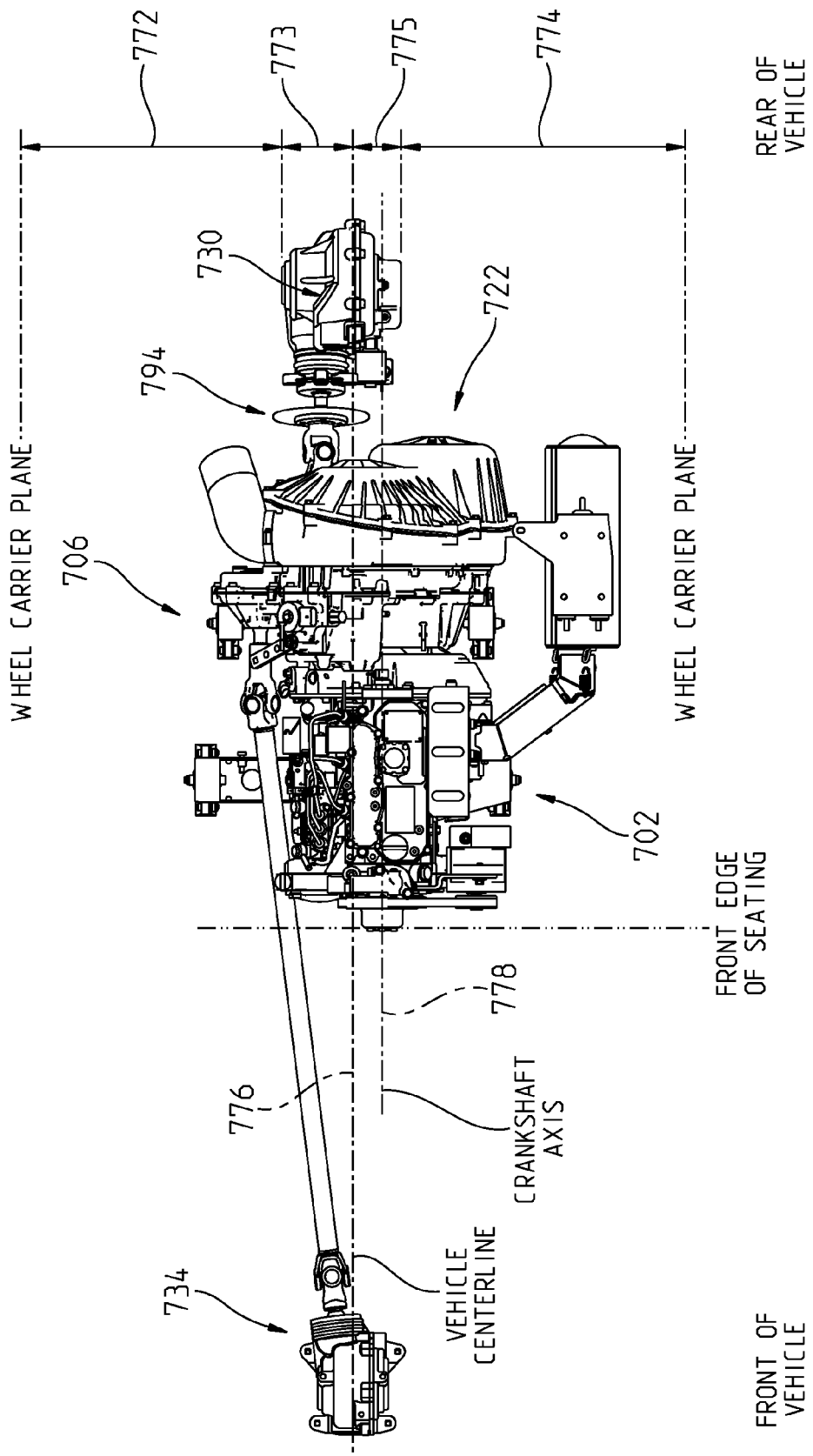
FIG. 26 illustrates a top view of the drivetrain system of FIG. 20.

Referring to FIG. 26, rear drive unit 730 is positioned offset from the centerline 776 of vehicle 100. As such, the lengths of the two output shafts 754 and 756 are different. In one embodiment, a distance 772 from a first side of rear drive unit 730 to a plane of a wheel carrier (where the wheel of the ground engaging member attaches to the carrier) for the ground engaging member 102 on the passenger side of vehicle 100 is about 533.5 millimeters while a distance 774 from a second side of rear drive unit 730 to a plane of a wheel carrier (where the wheel of the ground engaging member attaches to the carrier) for the ground engaging member 102 on the driver side of vehicle 100 is about 570.6 millimeters. In one embodiment, a distance 773 from a first side of rear drive unit 730 to plane 776 is about 120.4 millimeters while a distance 775 from a second side of rear drive unit 730 to plane 776 is about 82.3 millimeters. Rear drive unit 730 is mounted to plate 800 which is coupled to frame 150.

Figure 27:
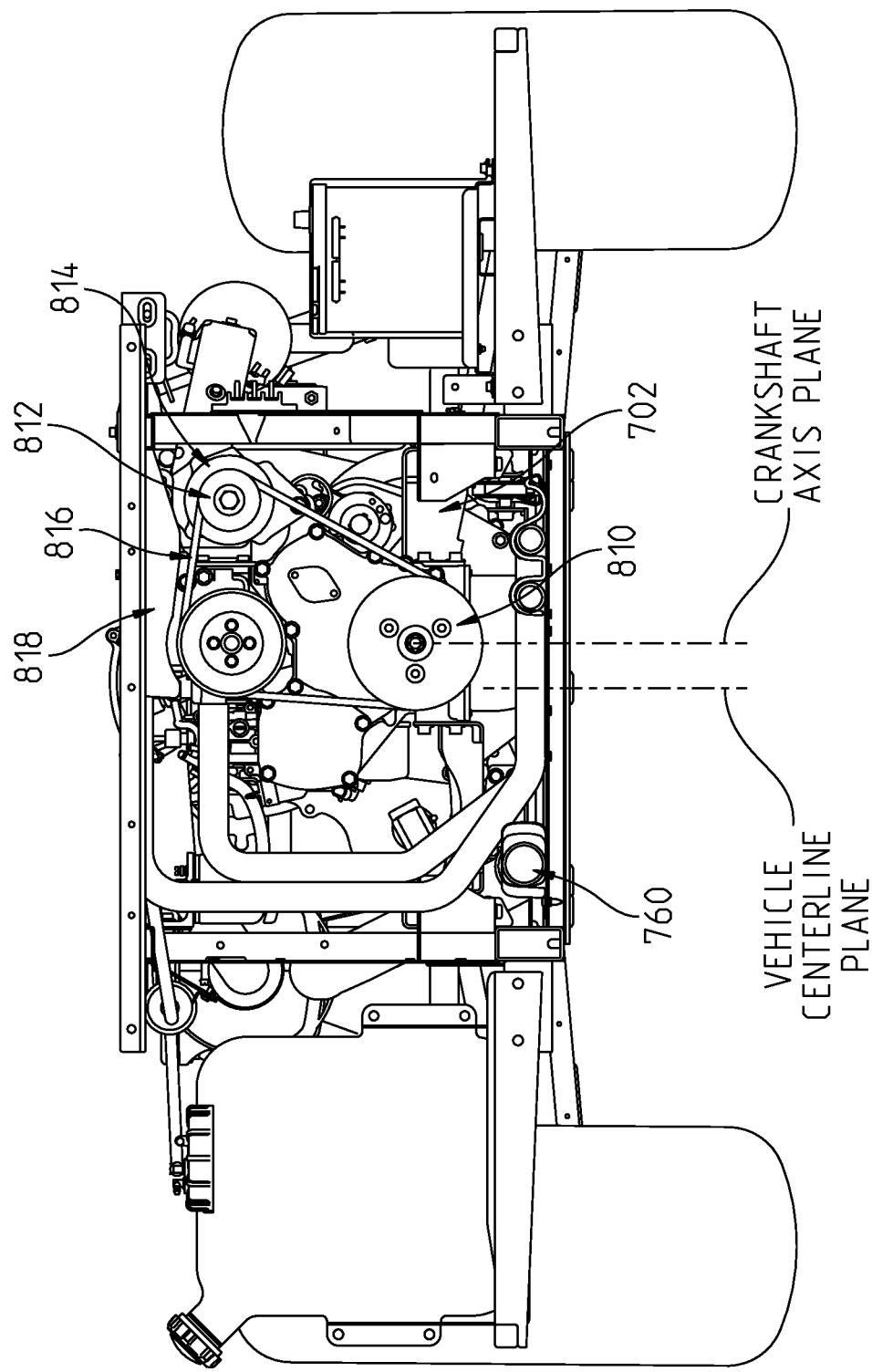
FIG. 27 is a front view through the operator area of FIG. 1 with the seating, roll cage, and body work removed.

As shown in FIG. 26 and FIG. 27, a vertical plane including the crankshaft axis 778 is offset from a vertical plane including the vehicle centerline 776. In one embodiment, the offset is about 2 inches. Diesel engine 702 is offset to provide space for prop shaft 760 to pass by diesel engine 702.

Figure 31:
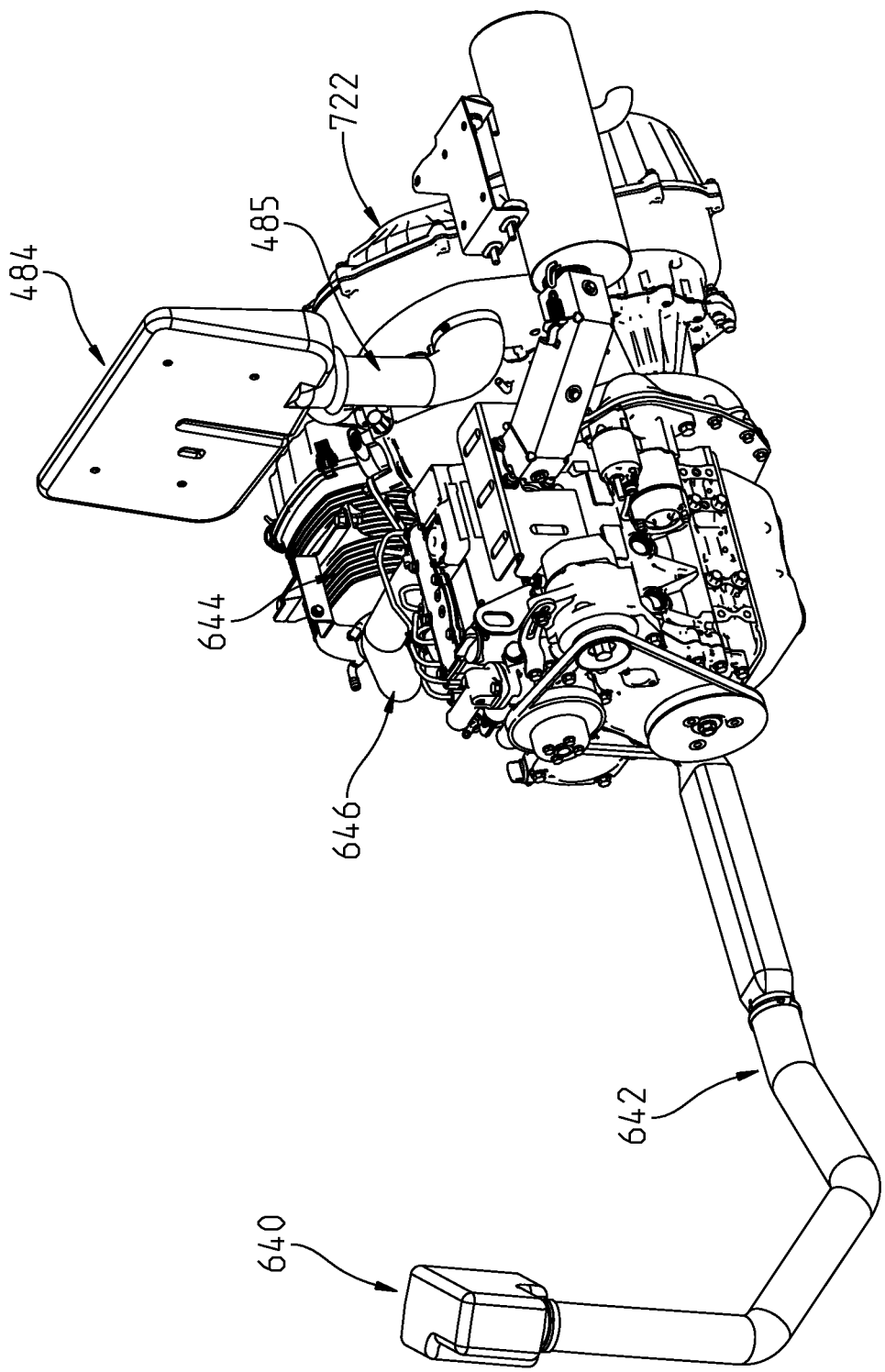
FIGS. 31 and 32 illustrate the air input and exhaust systems for the engine and the CVT of the vehicle.
Figure 32:
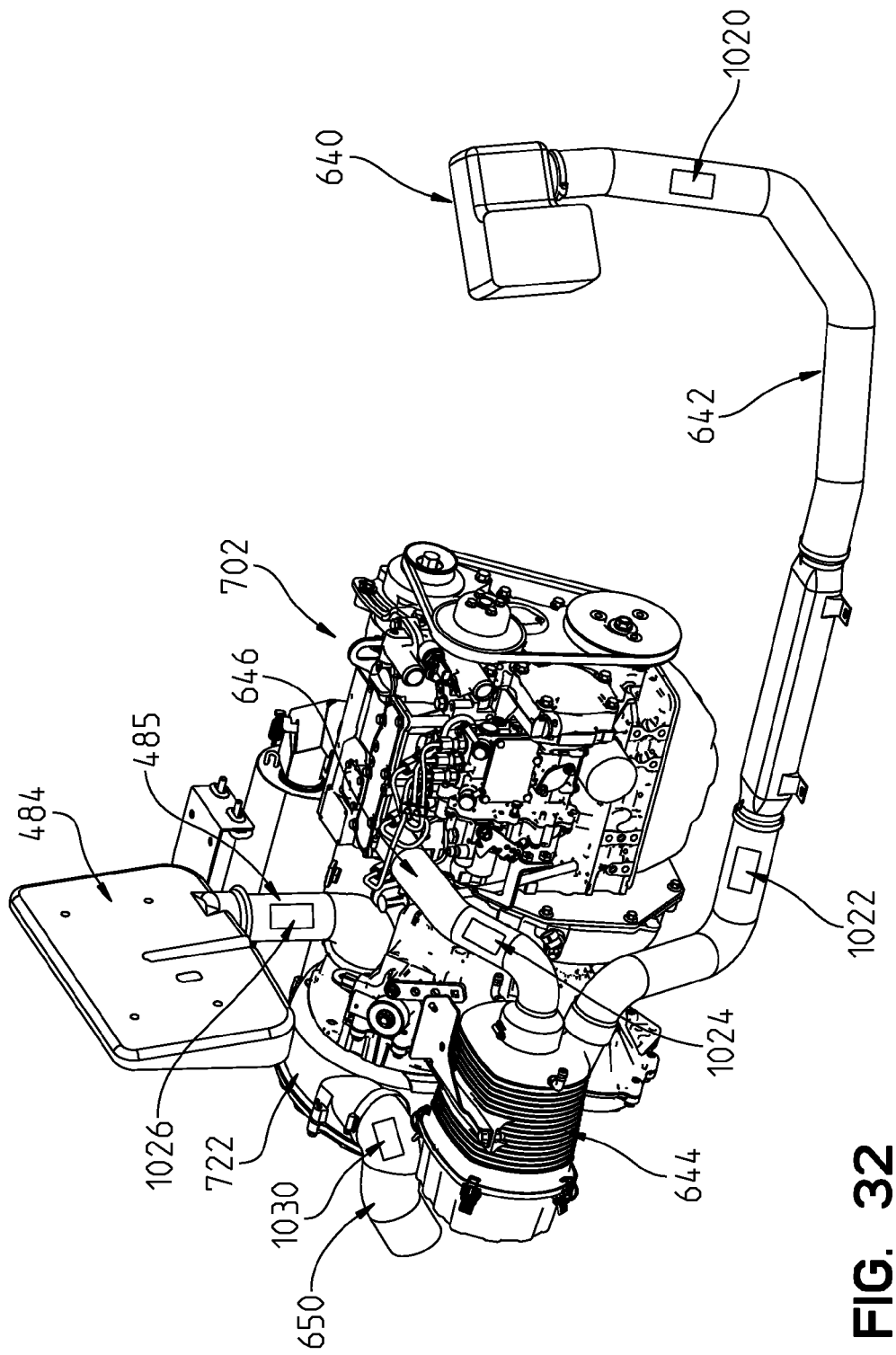

Returning to FIG. 28, an air intake housing 640 is shown in a forward portion of vehicle 100. The air intake housing 640 includes a filter which filters incoming air. The air intake housing 640 is in fluid communication with a fluid conduit 642 which travels on top of the skid plate back to the diesel engine 702. Referring to FIGS. 31 and 32, the fluid conduit 642 is in fluid communication with an airbox 644. In one embodiment, airbox 644 includes a filter unit to further filter the air. Air enters airbox 644 from fluid conduit 642 and exits the airbox 644 through a fluid conduit 646. By placing the air intake housing up in a front portion of vehicle 100, the amount of dust and other debris that is introduced into the air intake system is reduced.

Another air intake 484 is shown in FIGS. 31 and 32. Air intake 484 is for a CVT of drivetrain 112. Air intake 484 is positioned between the seats of seating 130 and is in fluid communication with a fluid conduit 485 which is in fluid communication with an interior of CVT housing 722. Additional details regarding the air intake 484 are provided in U.S. patent application Ser. No. 12/135,107, filed Jun. 6, 2008, the disclosure of which is expressly incorporated by reference herein. An air exhaust 650 for CVT housing 722 is shown in FIG. 32.

Referring to FIG. 27, pulley 810 is coupled to the crankshaft of diesel engine 702. Pulley 810 is coupled to a pulley 812 of alternator 814 through a belt 816. The rotation of pulley 810 causes belt 816 to move and pulley 812 to rotate. A belt guard 818 is coupled to frame 150 and extends over belt 816 under seating 132. The ratio of pulley 810 to pulley 812 is selected to increase the charging capacity of alternator 814. In one embodiment, pulley 812 provides at least about 60% charging capacity when diesel engine 702 is at idle and 100% when diesel engine 702 is operating at about 50% engine capacity. In one embodiment, pulley 812 provides at least about 70% charging capacity when diesel engine 702 is at idle and 100% when diesel engine 702 is operating at about 50% engine capacity. In one embodiment, alternator 814 provides about 50% percent of its charging capacity when diesel engine 702 is at idle and about 100% charging capacity when diesel engine 702 is operating at about 50% engine capacity. In one embodiment, alternator 814 provides about 34 amperes when diesel engine 702 is at idle and about 55 amperes when diesel engine 702 is operating at about 50% engine capacity. In the illustrated embodiment, the ratio of pulley 810 to pulley 812 is about 2.31 to 1. An exemplary alternator is the Denso 55A alternator.

Figure 9:
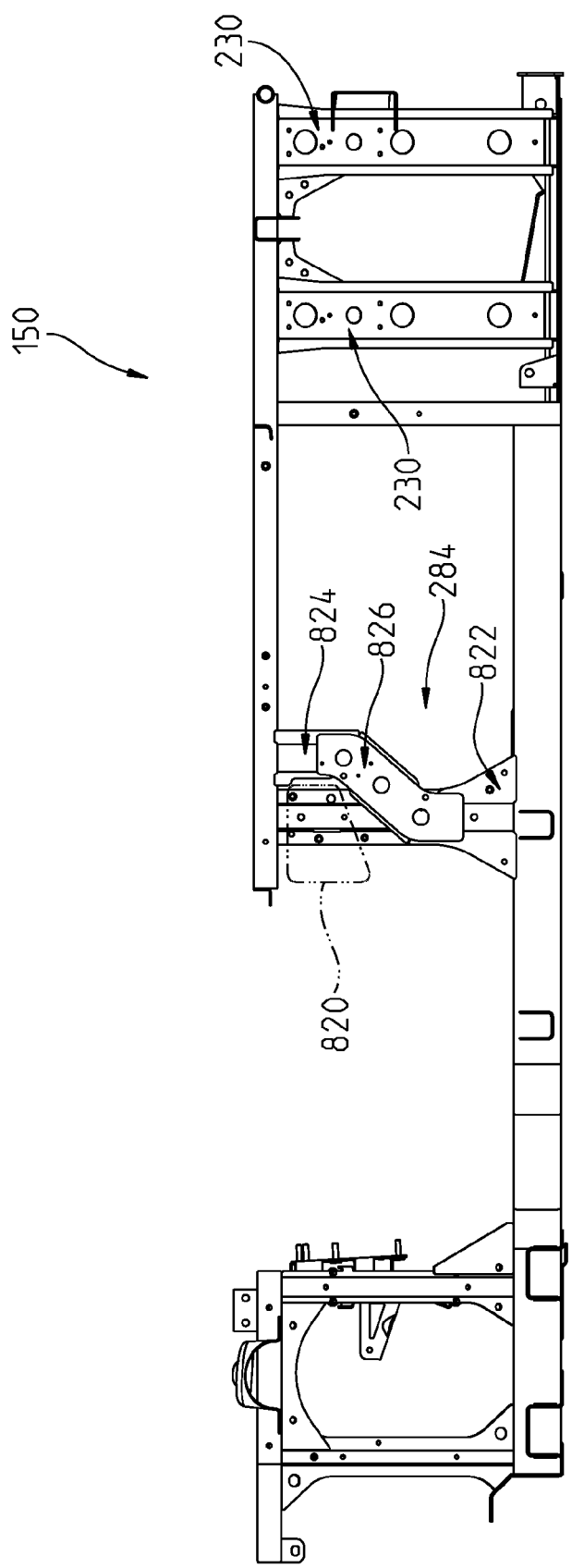
FIG. 9 illustrates a left side view of the frame of the chassis of FIG. 8.
Figure 10:
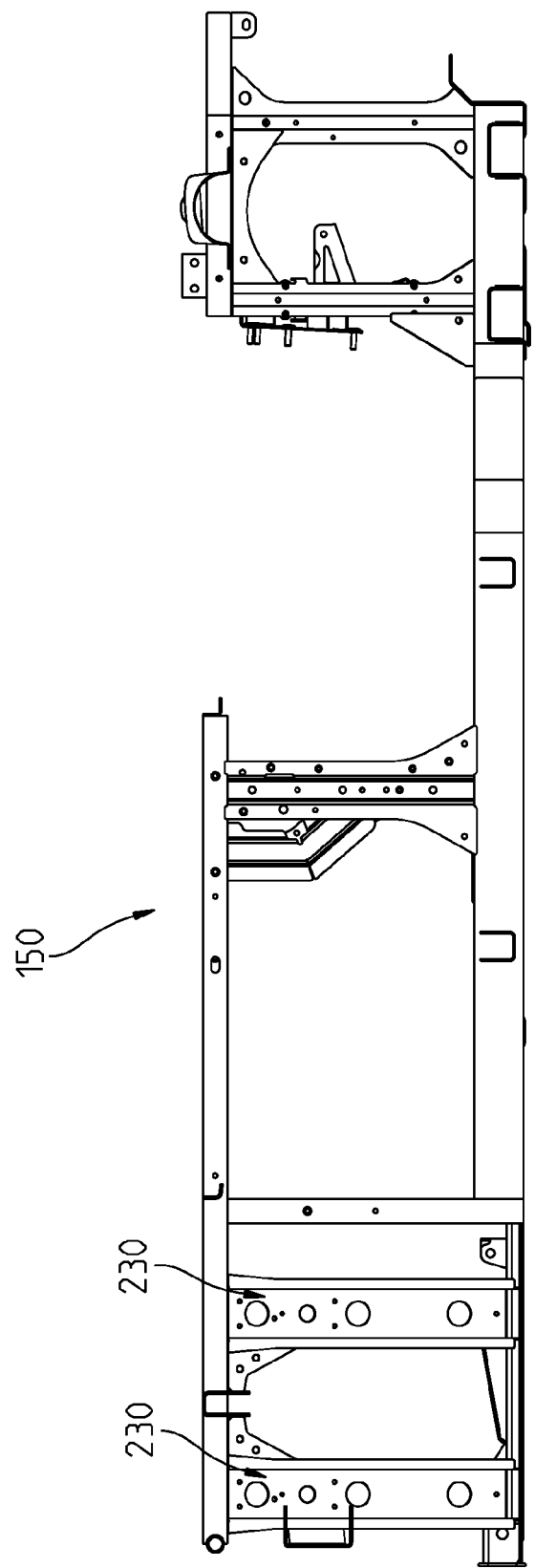
FIG. 10 illustrates a right side view of the frame of the chassis of FIG. 8.
Figure 12:
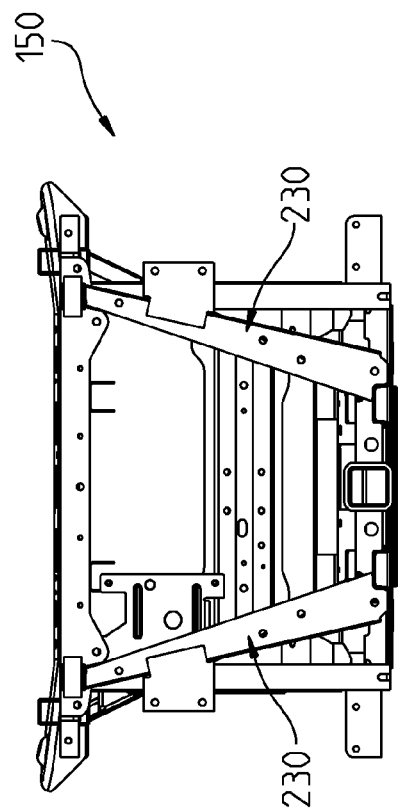
FIG. 12 illustrates a rear view of the frame of the chassis of FIG. 8.
Figure 11:
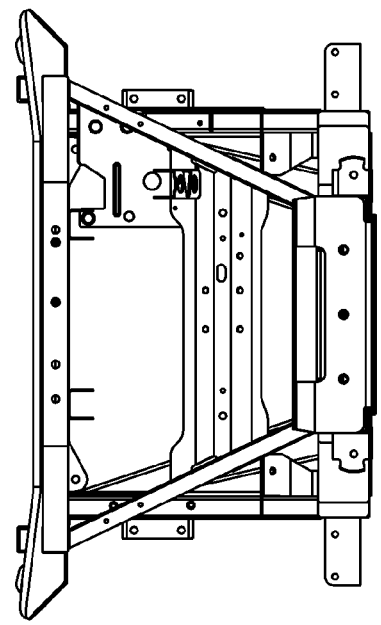
FIG. 11 illustrates a front view of the frame of the chassis of FIG. 8.
Figure 13:
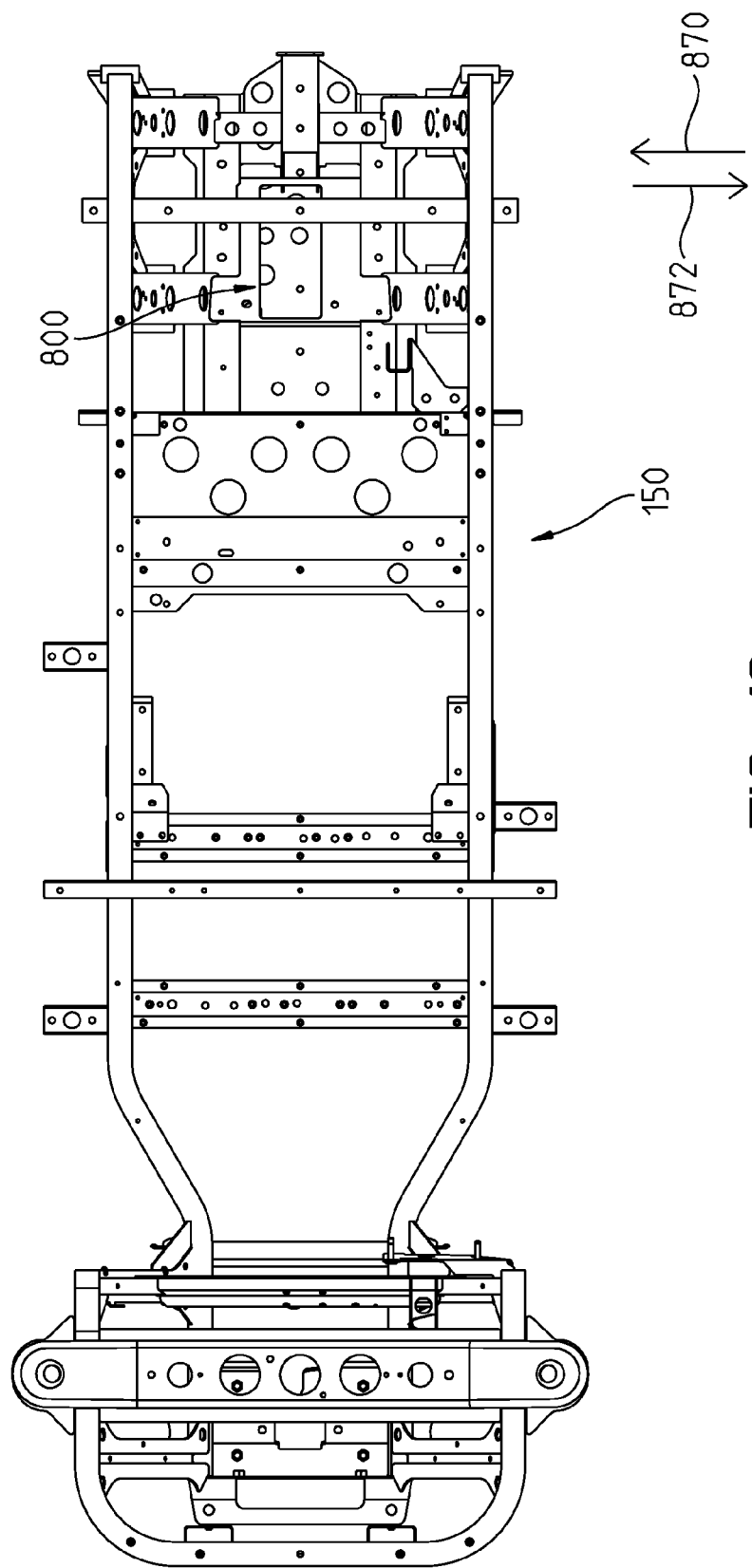
FIG. 13 illustrates a top view of the frame of the chassis of FIG. 8.
Figure 14:
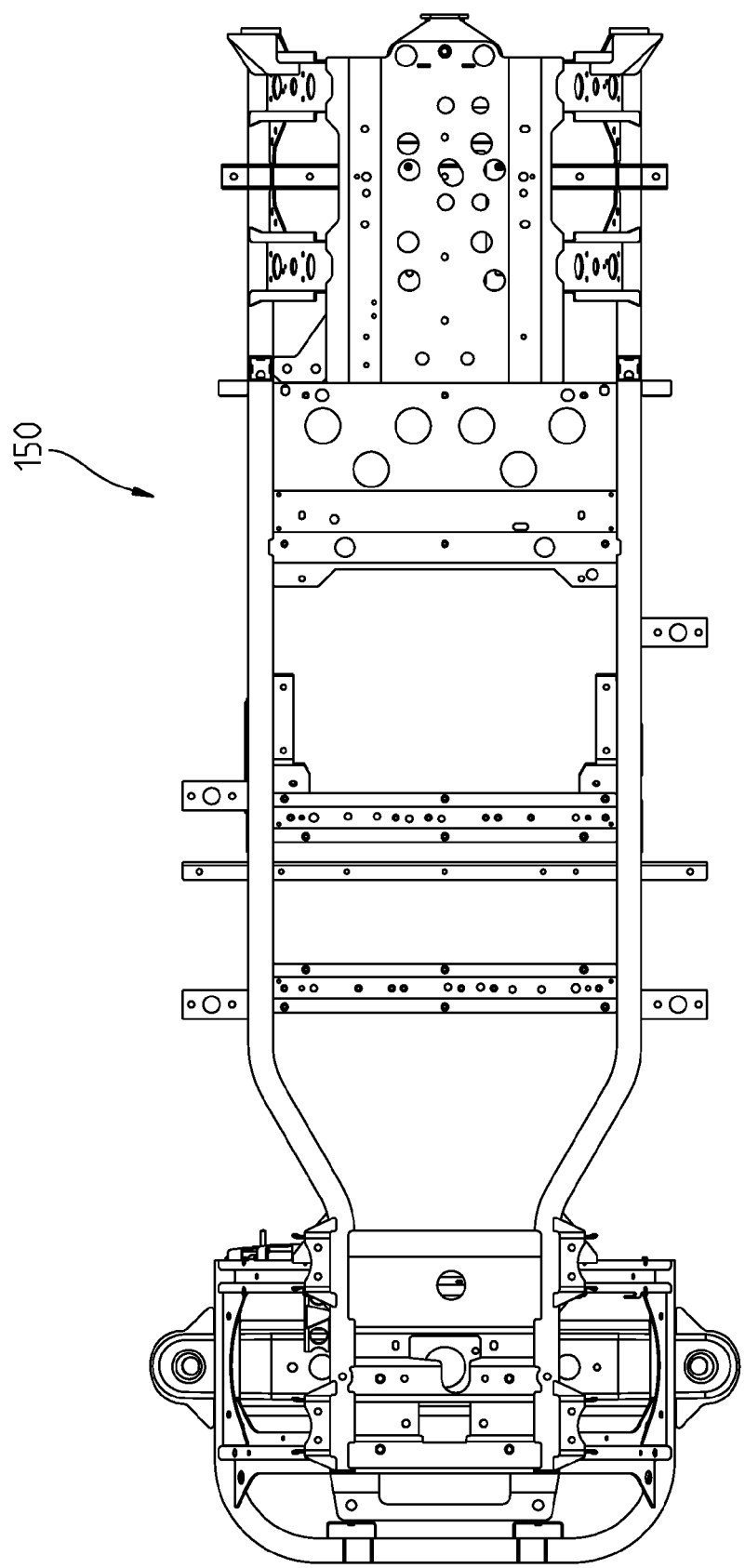
FIG. 14 illustrates a bottom view of the frame of the chassis of FIG. 8.

Referring to FIG. 9, alternator 814 is positioned in location 820. In order to accommodate alternator 814 in location 820, the vertical support members 284 on the driver side of frame 150 includes a lower portion 822 and an upper portion 824 offset rearward of lower portion 822. The middle section is stiffened with a stiffening member 826.

Figure 17:
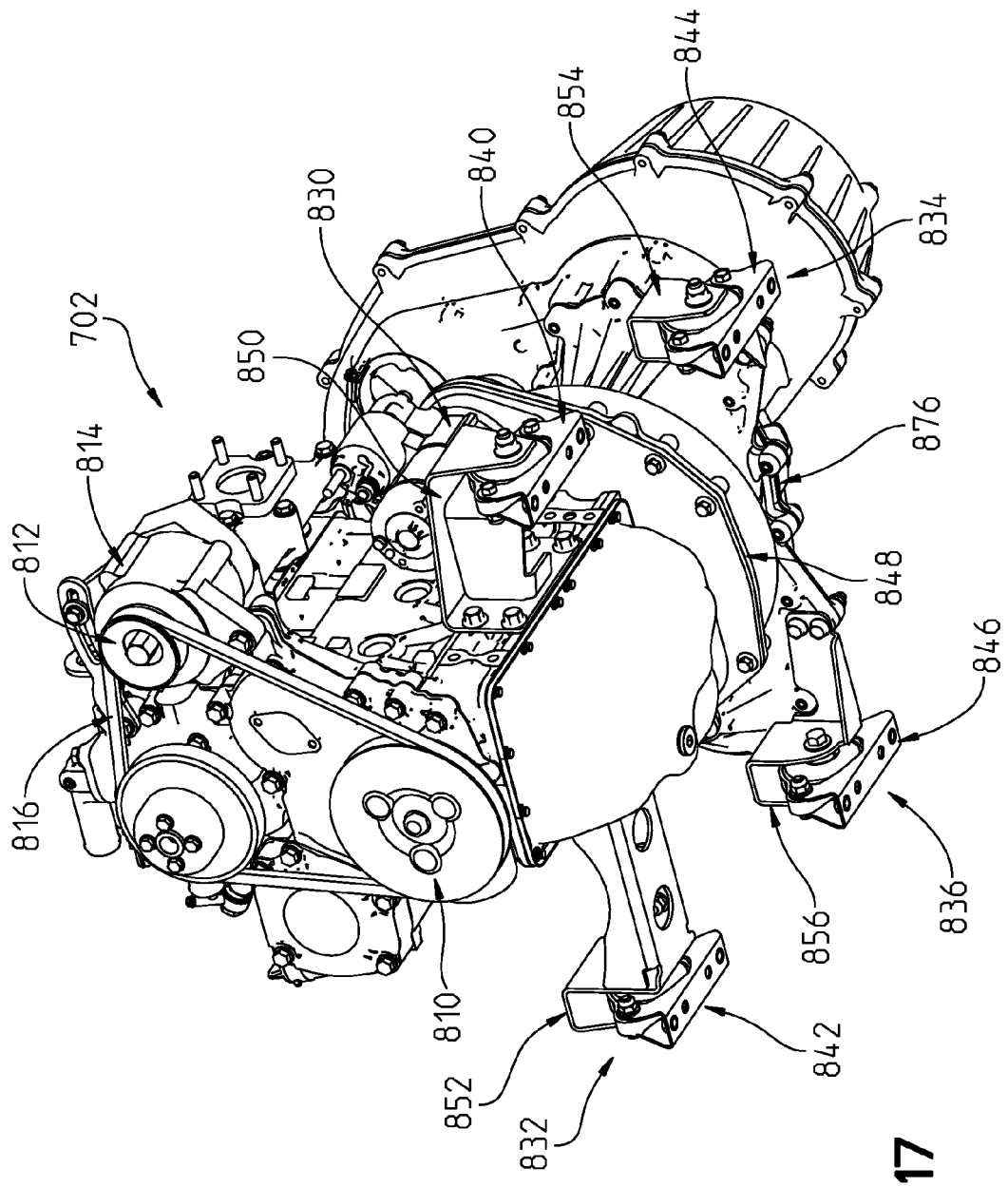
FIG. 17 illustrates a first lower perspective view of the engine and transmission of the drivetrain of FIG. 15 including the mounts of FIG. 16.
Figure 18:
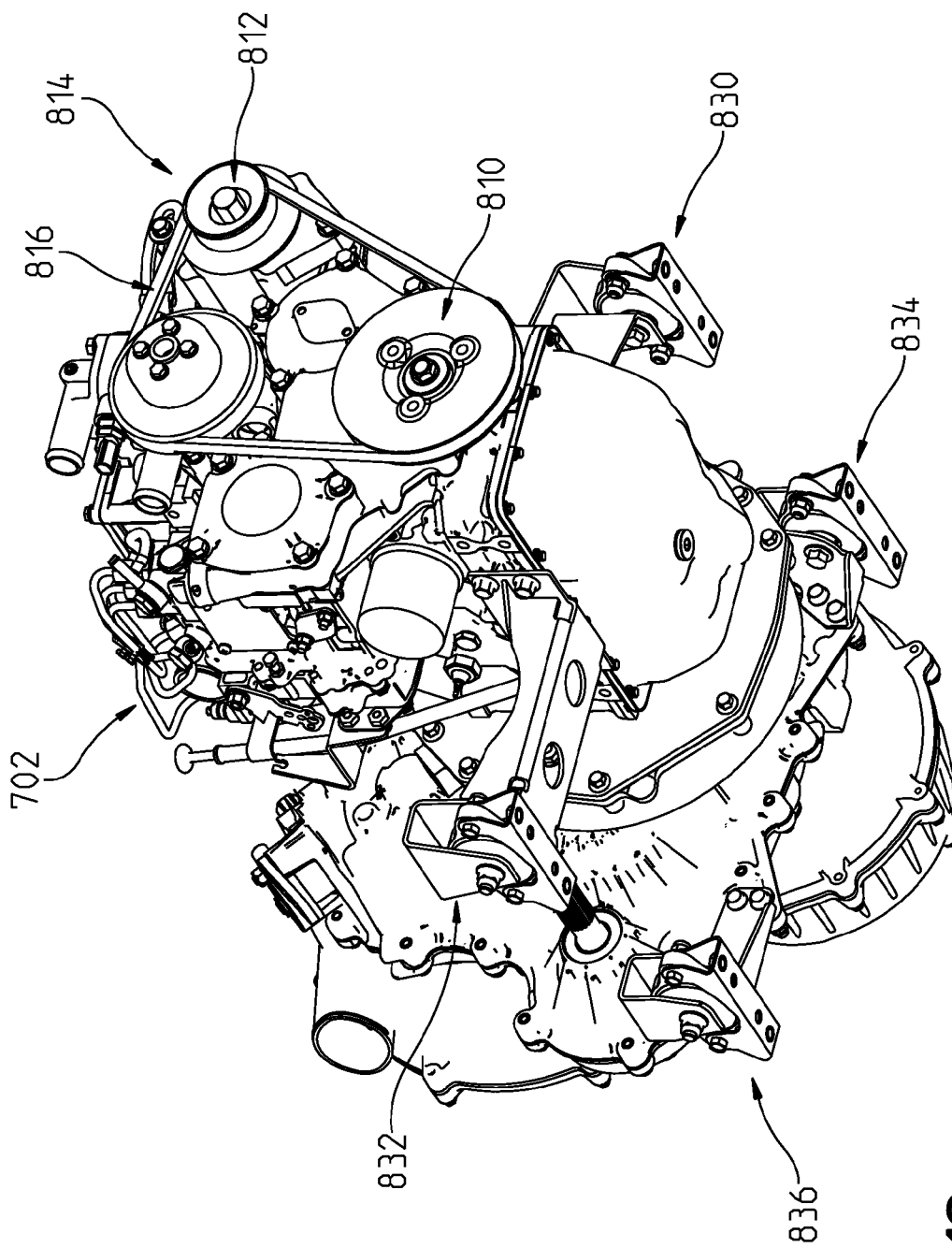
FIG. 18 illustrates a second lower perspective view of the engine and transmission of the drivetrain of FIG. 15 including the mounts of FIG. 16.

Referring to FIGS. 17 and 18, diesel engine 702, shiftable transmission housing 706, and CVT housing 722 are supported by four engine mounts: front mount 830, front mount 832, rear mount 834, and rear mount 836. Each of front mount 830, front mount 832, rear mount 834, and rear mount 836 have a corresponding lower portion (lower portion 840, lower portion 842, lower portion 844, and lower portion 846) coupled to frame 150 and a corresponding upper portion (upper portion 850, upper portion 852, upper portion 854, and upper portion 856). Upper portion 850 and upper portion 852 are coupled directly to diesel engine 702. Upper portion 854 and upper portion 856 are coupled directly to shiftable transmission housing 706. Diesel engine 702 and shiftable transmission housing 706 are in turn coupled together at location 848 (see FIG. 17).

Figure 19:
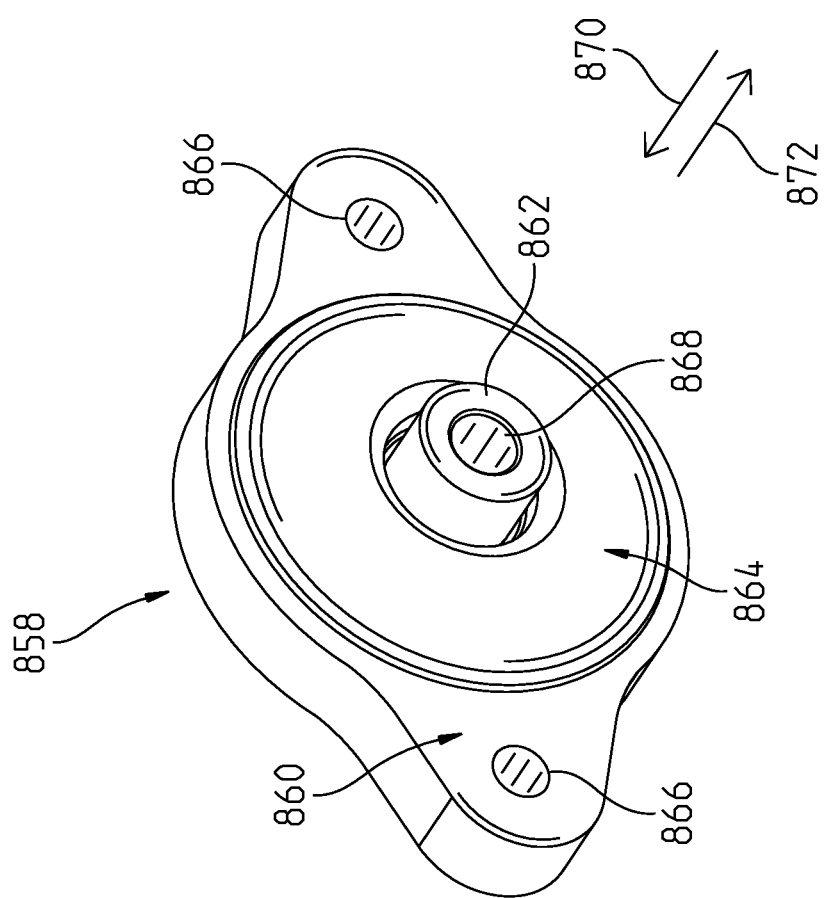
FIG. 19 illustrates a portion of one of the mounts of FIG. 16.

Each of lower portion 840, lower portion 842, lower portion 844, and lower portion 846 are coupled to the corresponding one of upper portion 850, upper portion 852, upper portion 854, and upper portion 856 through a coupling member 858. Referring to FIG. 19, coupling member 858 includes a first base portion 860, a second base portion 862, and a connecting portion 864. First base portion 860 is coupled to the respective lower portion 840-846 with fasteners that are received through apertures 866. Second base portion 862 is coupled to the respective upper portion 850-856 with a fastener that is received through opening 868. Connecting portion 864 couples first base portion 860 to second base portion 862. Connecting portion 864 is an elastomer or other type of material which permits second base portion 862 to move relative to first base portion 860 generally along its axis in direction 870 and direction 872, but to generally maintain the position of second base portion 862 relative to first base portion 860 in radial directions. In one embodiment, the durometer of connecting portion 864 is about 70. In one embodiment, the durometer of connecting portion 864 is selected such that the assembly of diesel engine 702, shiftable transmission housing 706, and CVT housing 722 may move about 0.5 inches side-to-side in direction 870 or direction 872 (see FIG. 13).

Referring to FIGS. 18 and 20, mounts 834 and 836 are positioned lower than mounts 830 and 832. In one embodiment, mounts 830-836 are all positioned in the same plane. In one embodiment, mounts 830 and 832 are positioned in a first plane and mounts 834 and 836 are positioned in a second plane offset from the first plane. In one embodiment, the second plane is lower than the first plane. In one embodiment, the second plane is higher than the first plane.

In one embodiment, instead of four mounts 830-836, only three mounts are provided to support the assembly of diesel engine 702, shiftable transmission housing 706, and CVT housing 722. In one embodiment, front mount 830 and front mount 832 are provided as shown in FIG. 17 and a single mount coupled to shiftable transmission housing 706 replaces rear mount 834 and rear mount 836 at a location 876.

Figure 25:
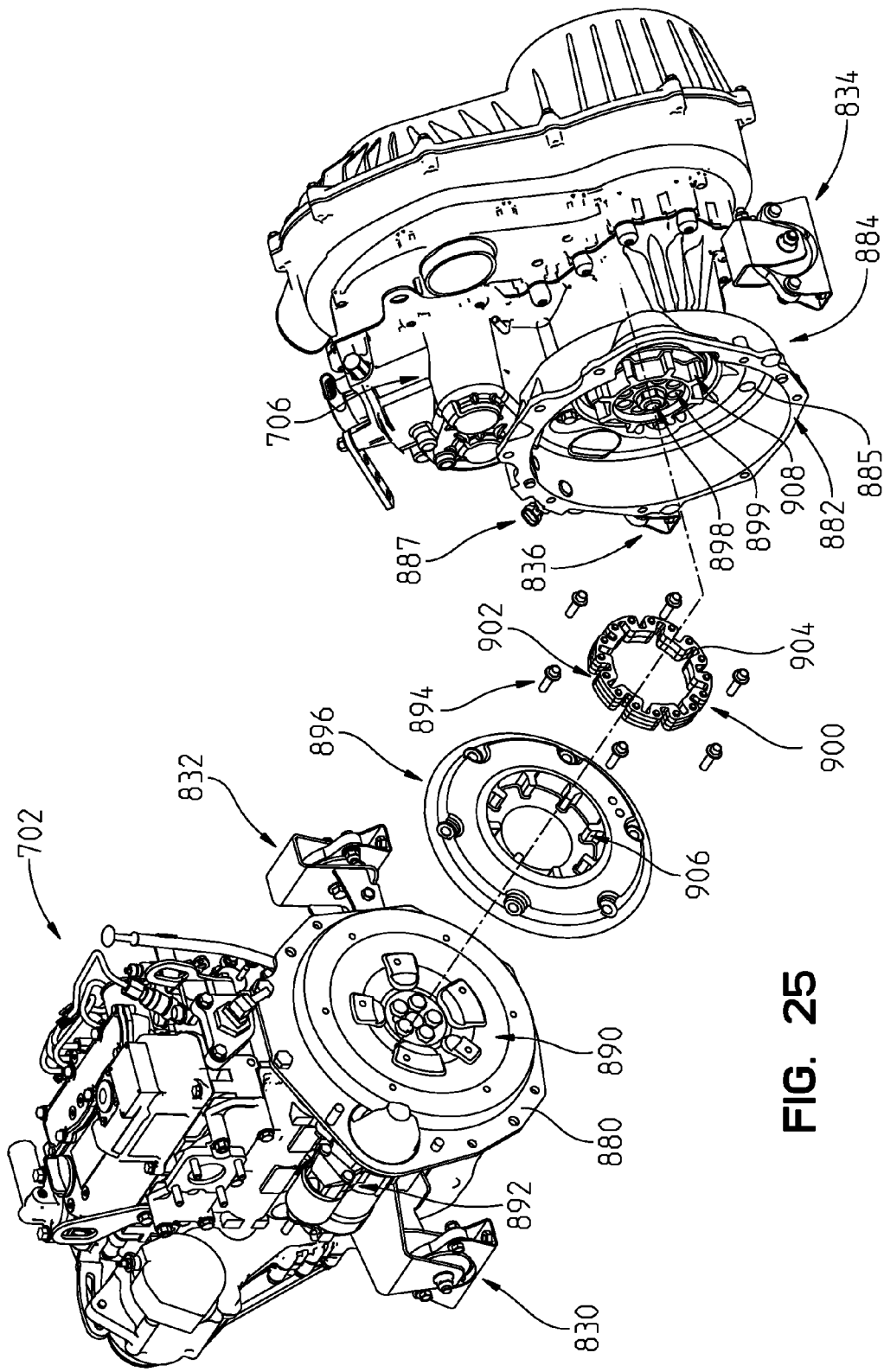
FIG. 25 illustrates the connection between a engine and a transmission of the drivetrain system of FIG. 20

Referring to FIG. 25, the connection between diesel engine 702 and shiftable transmission housing 706 are shown. A flange 880 of diesel engine 702 mates with a flange 882 of a bell housing 884 of shiftable transmission housing 706 and is secured thereto with a plurality of fasteners (see FIGS. 17 and 18). A flywheel 890 is coupled to the crankshaft of diesel engine 702. Flywheel 890 is rotated by the crankshaft. Further, flywheel 890 may be rotated by an electric starter 892 to initiate the operation of diesel engine 702. Attached to flywheel 890 through fasteners 894 is a coupling member 896. In one embodiment, coupling member 896 is weighted and weighs about 17 kilograms. Coupling member 896 is weighted to provide additional mass to dampen vibrations from diesel engine 702. In one embodiment, diesel engine 702 is a multi-cylinder diesel engine and the weight of coupling member 896 balances out the vibration from the diesel engine firing. In one embodiment, diesel engine 702 is a three cylinder diesel engine and the weight of coupling member 896 balances out the vibration from the diesel engine firing.

Coupling member 896 makes the connection between the crankshaft of diesel engine 702 and the input shaft 898 of gearbox 708. The input shaft 898 of gearbox 708 is coupled to a coupling member 899. In the illustrated embodiment, a connection is made between coupling member 896 of diesel engine 702 and coupling member 899 of gearbox 708 through an intermediate coupler 900. Intermediate coupler 900 includes a plurality of recesses 902 on an exterior diameter and a plurality of recesses 904 on an interior diameter. Recesses 902 cooperate with fingers 906 of coupling member 896 to couple intermediate coupler 900 to coupling member 896. Recesses 904 cooperate with fingers 908 of coupling member 899 to couple intermediate coupler 900 to coupling member 899. Intermediate coupler 900 is illustratively made of a resilient material, such as elastomeric rubber, and provides torsional dampening between engine 702 and gearbox 708. Further, intermediate coupler 900 reduces gear noise, reduces torque pulses, reduces impact loading of gear teeth, and reduces clutch wear of CVT 714.

Bell housing 884 includes a drain opening 884 in a lower portion of bell housing 884 and a timing observation slot in an upper portion of bell housing 884. Bell housing 884 also supports an engine RPM sensor 887. In one embodiment, sensor 887 is a Hall effect sensor.

Figure 21:
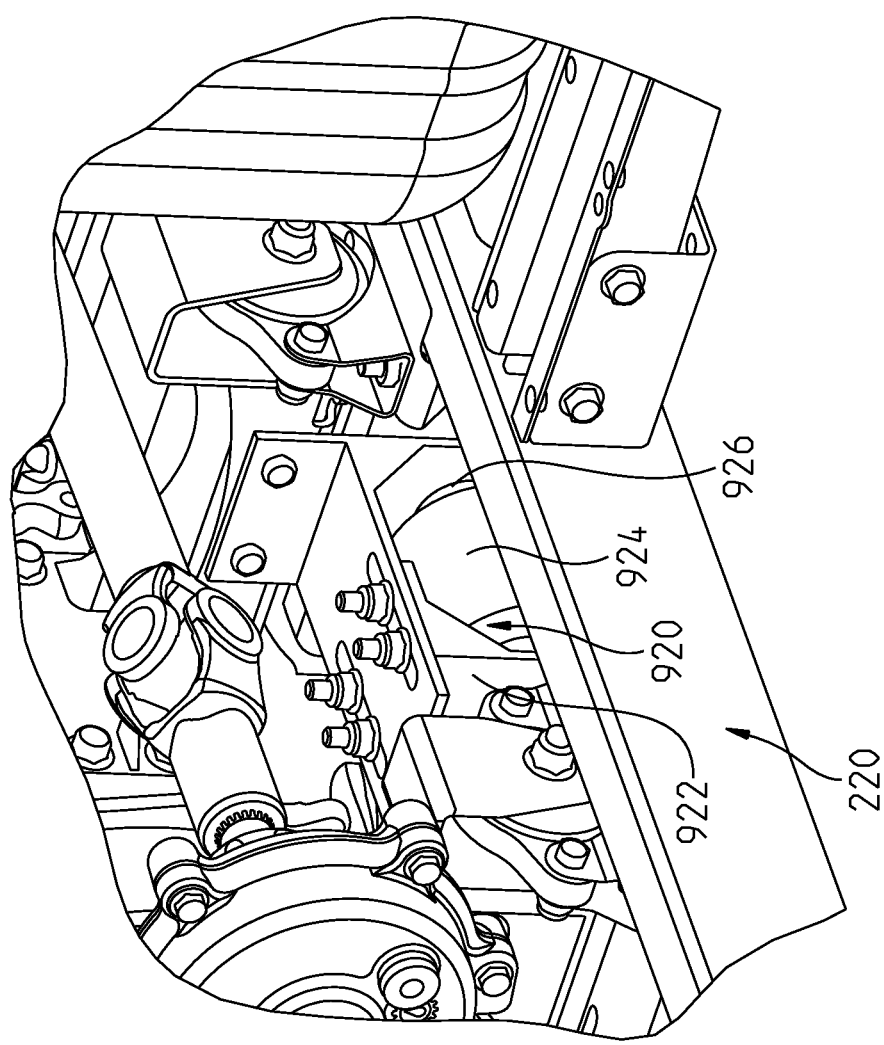
FIG. 21 illustrates a damping member mounted to the engine of the drivetrain system of FIG. 20.
Figure 22:
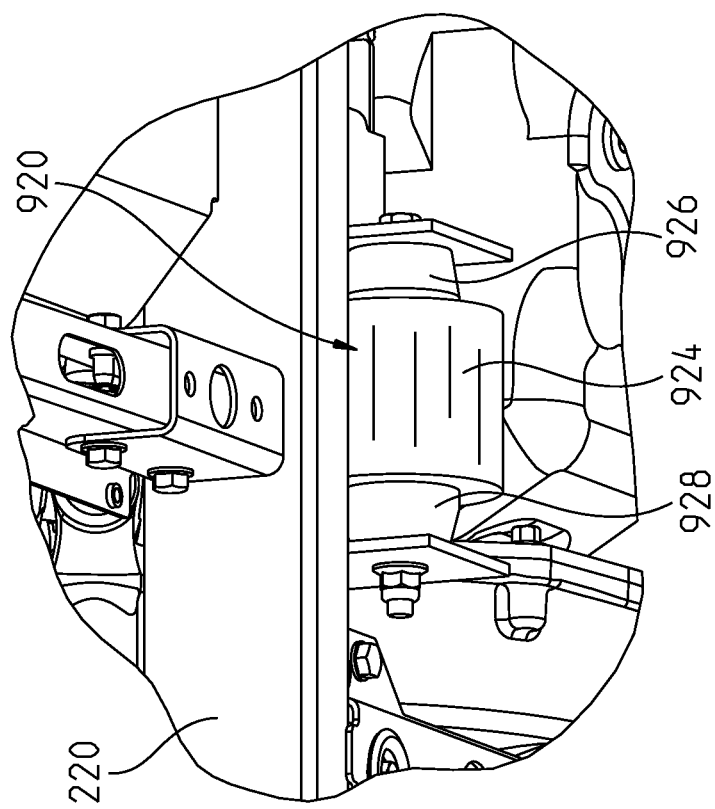
FIG. 22 illustrates a lower perspective view of the damping member of FIG. 21.

Referring to FIGS. 21 and 22, in one embodiment, a damping member 920 is mounted to diesel engine 702. Damping member 920 includes a bracket 922 which carries a damping mass 924. Damping mass 924 is placed between two rubber isolators 926. Isolators 926 and damping mass 924 are supported by a fastener which passes through openings in each and which is coupled to bracket 922. Isolators 926 do permit the movement of damping mass 924.

The damping member 920 is coupled to the diesel engine 702 or the shiftable transmission housing. Since the engine/transmission are mounted to the frame 150 through mounts 830-836, the engine transmission vibrate at a resonance frequency. When the engine firing frequency matches this resonance frequency, the engine assembly resonants and the amplified vibration is felt by the rider, such as through steering wheel 500. In one embodiment, the resonance frequency is about 32 Hertz.

The damping member 920 is tuned to resonate at generally the same resonance frequency as the engine/transmission assembly. The damping member 920 acts to counteract the vibration of the engine/transmission assembly to reduce the amount of vibration experienced by the operator. In the case of the engine/transmission assembly, the resonance is in the roll direction (rolls, back and forth along the crankshaft axis). In order to increase the effectiveness of damping member 920, it is located as far off the crankshaft axis as possible, but still being coupled to the engine/transmission assembly.

In one embodiment, the mass of damping mass 924 is adjusted until the resonance frequency of damping member 920 generally is at the same frequency as the engine/transmission assembly. In one embodiment, damping mass 924 is a metal weight which weighs about 6.6 kilograms and isolators 926 are rubber members having a stiffness of about 50 N/millimeter radially and 1400 N/millimeter axially.

Figure 23:
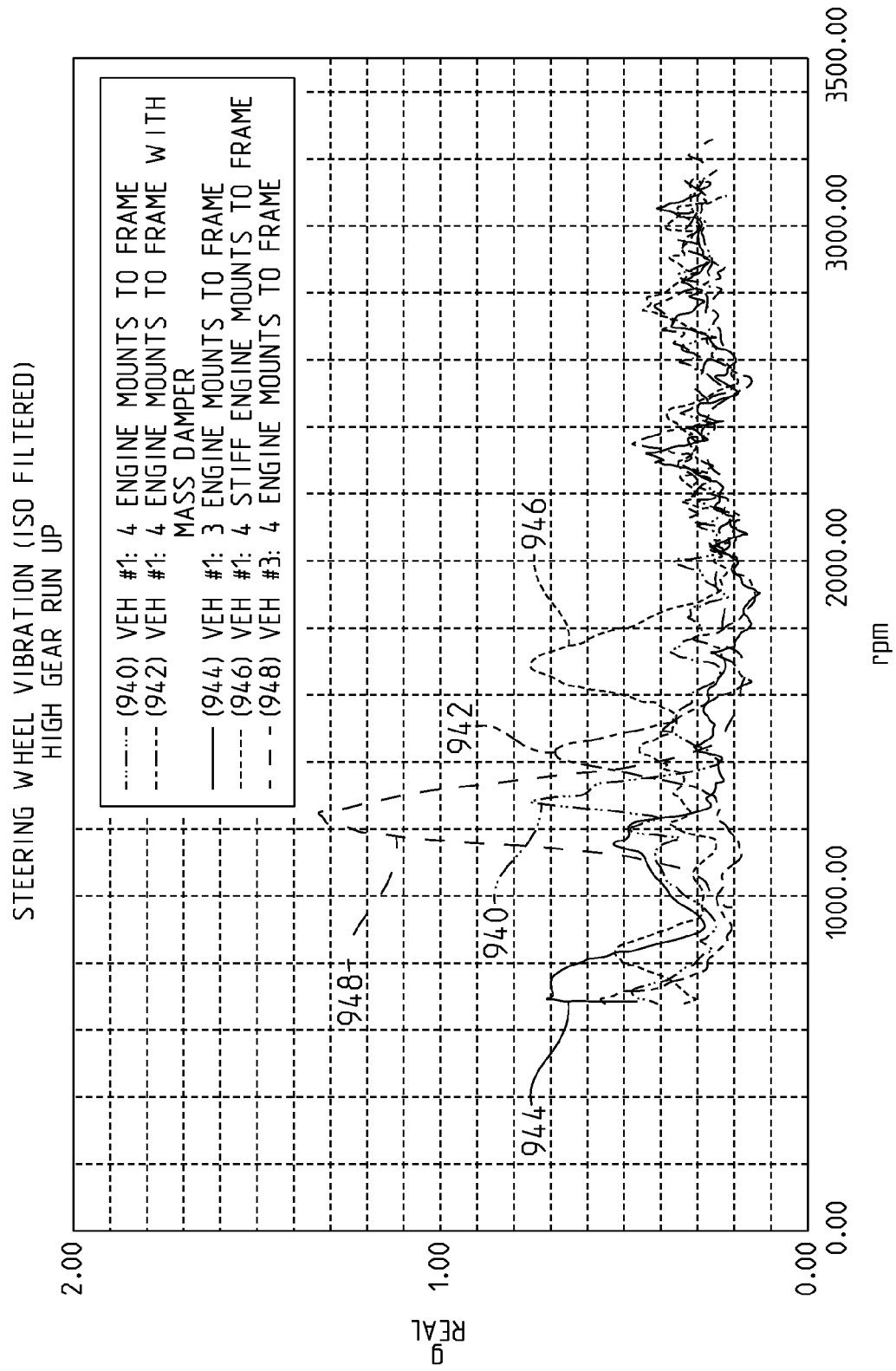
FIG. 23 illustrates the effect of the damping member of FIGS. 21 and 22 on vibration when the vehicle is running in a high gear.
Figure 24:
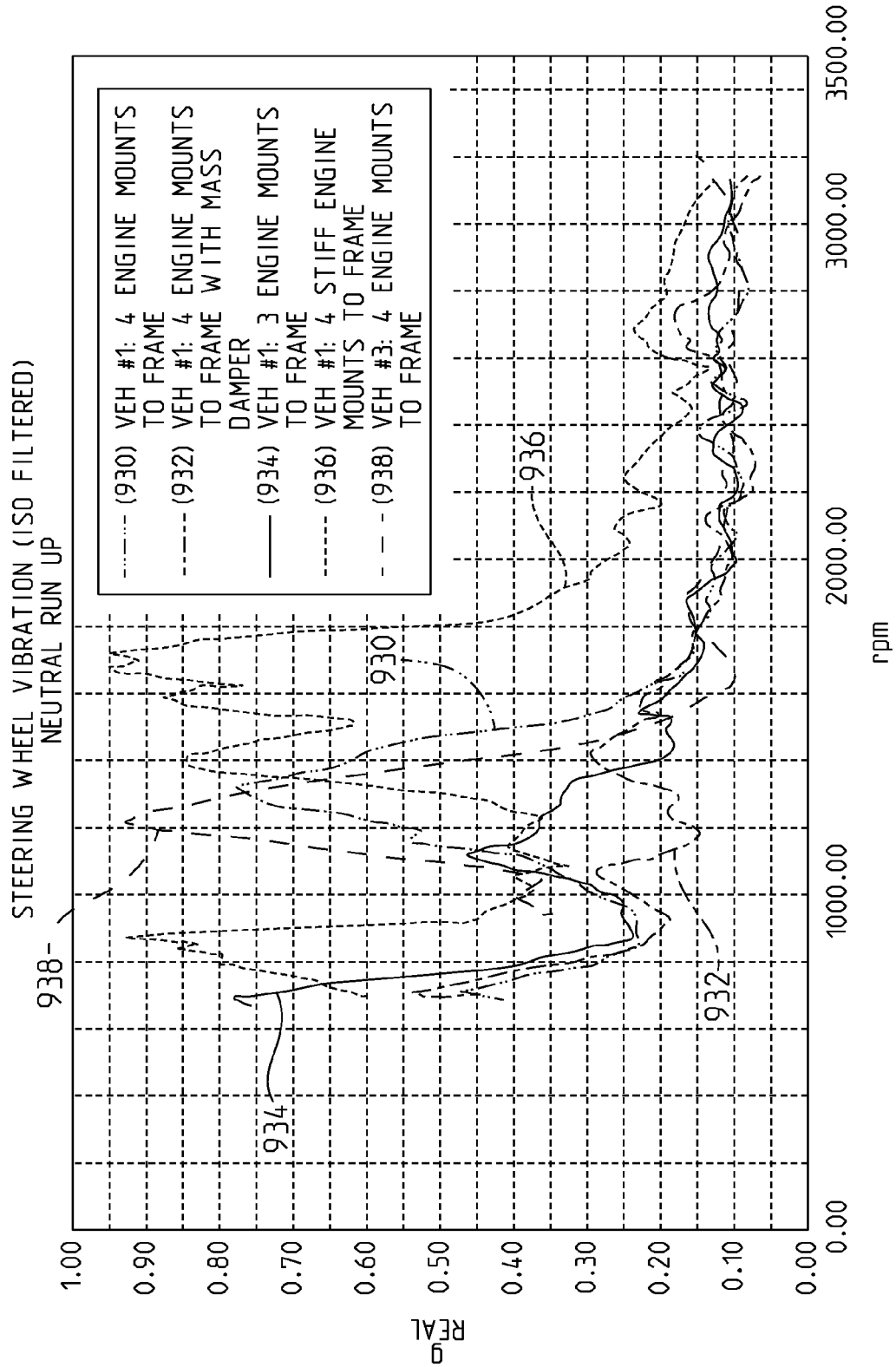
FIG. 24 illustrates the effect of the damping member of FIGS. 21 and 22 on vibration when the vehicle is running in a neutral setting.

Referring to FIGS. 23 and 24, the effect of the inclusion of damping member 920 is shown. Referring to FIG. 24, the effect of damping member 920 while gear selector unit 726 is in a neutral setting is shown. The rpm of diesel engine 702 is shown on the x-axis and the amount of vibration experienced at the steering wheel 500, measured in g (acceleration—linear scale), is shown on the y-axis. The acceleration at the steering wheel is measured with an accelerometer attached to the steering wheel 500. Curve 930 corresponds to a first test vehicle 100 having the engine mounts described herein with a 70 durometer polyurethane connecting portion 864. Curve 932 corresponds to the same first test vehicle including a damping member 920 with a 6.6 kilogram damping mass 924 coupled to diesel engine 702. Curve 934 corresponds to the same test vehicle having a three mount configuration instead of four (two on the engine, one on the transmission). Curve 936 corresponds to the same test vehicle having the engine mounts described herein with a 80 durometer polyurethane connecting portion 864. Curve 938 corresponds to a second test vehicle having the setup of the first test vehicle of curve 930.

Referring to FIG. 23, the effect of damping member 920 while gear selector unit 726 is in a high forward gear setting is shown. For the curves presented, the vehicle was driven on an asphalt test track. The rpm of diesel engine 702 is shown on the x-axis and the amount of vibration experienced at the steering wheel 500, measured in g (acceleration—linear scale), is shown on the y-axis. Curve 940 corresponds to a first test vehicle 100 having the engine mounts described herein with a 70 durometer polyurethane connecting portion 864. Curve 942 corresponds to the same first test vehicle including a damping member 920 with a 6.6 kilogram damping mass 924 coupled to diesel engine 702. Curve 944 corresponds to the same test vehicle having a three mount configuration instead of four (two on the engine, one on the transmission). Curve 946 corresponds to the same test vehicle having the engine mounts described herein with a 80 durometer polyurethane connecting portion 864. Curve 948 corresponds to a second test vehicle having the setup of the first test vehicle of curve 940.

Figure 2:
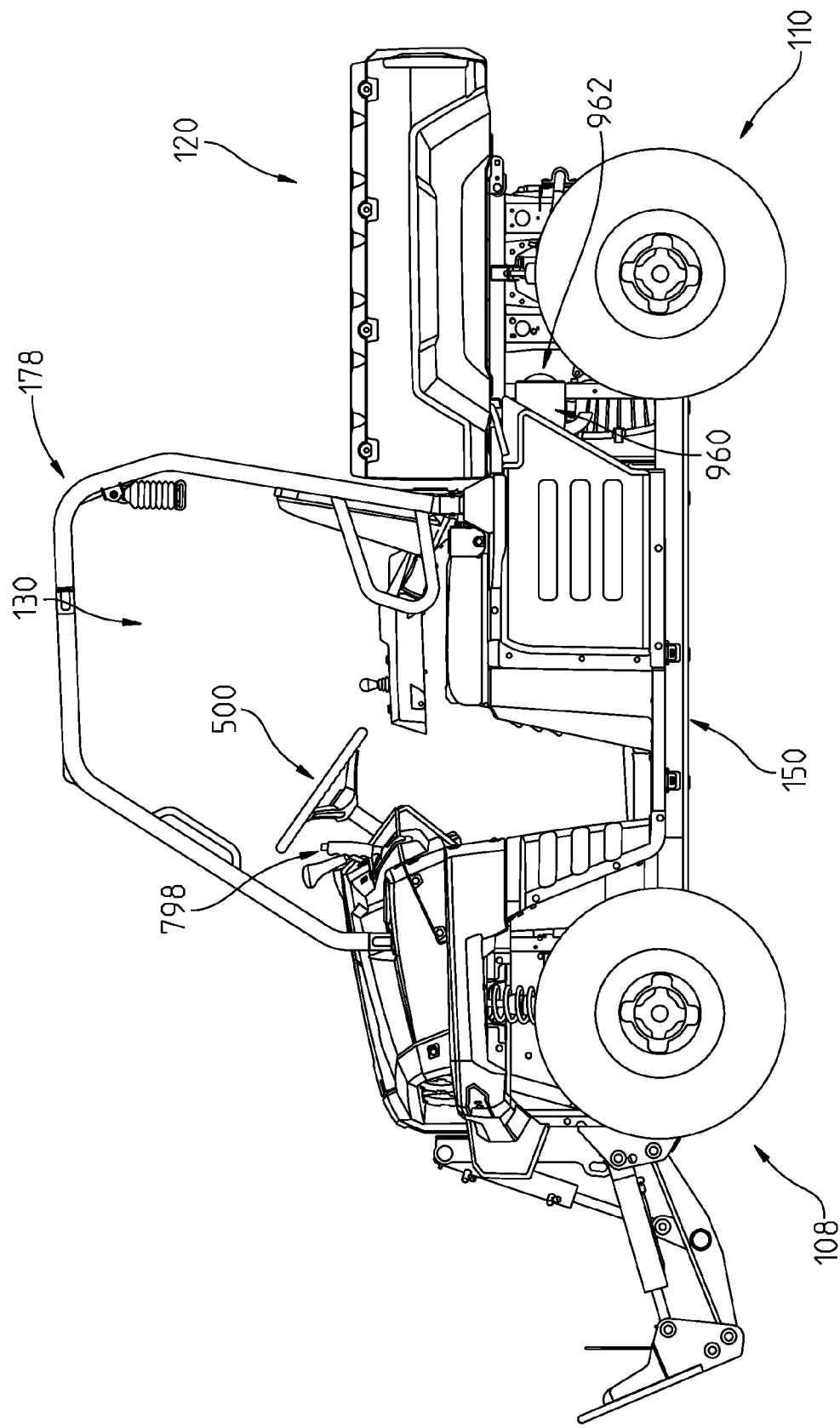
FIG. 2 illustrates a left side view of the exemplary utility vehicle of FIG. 1.
Figure 3:
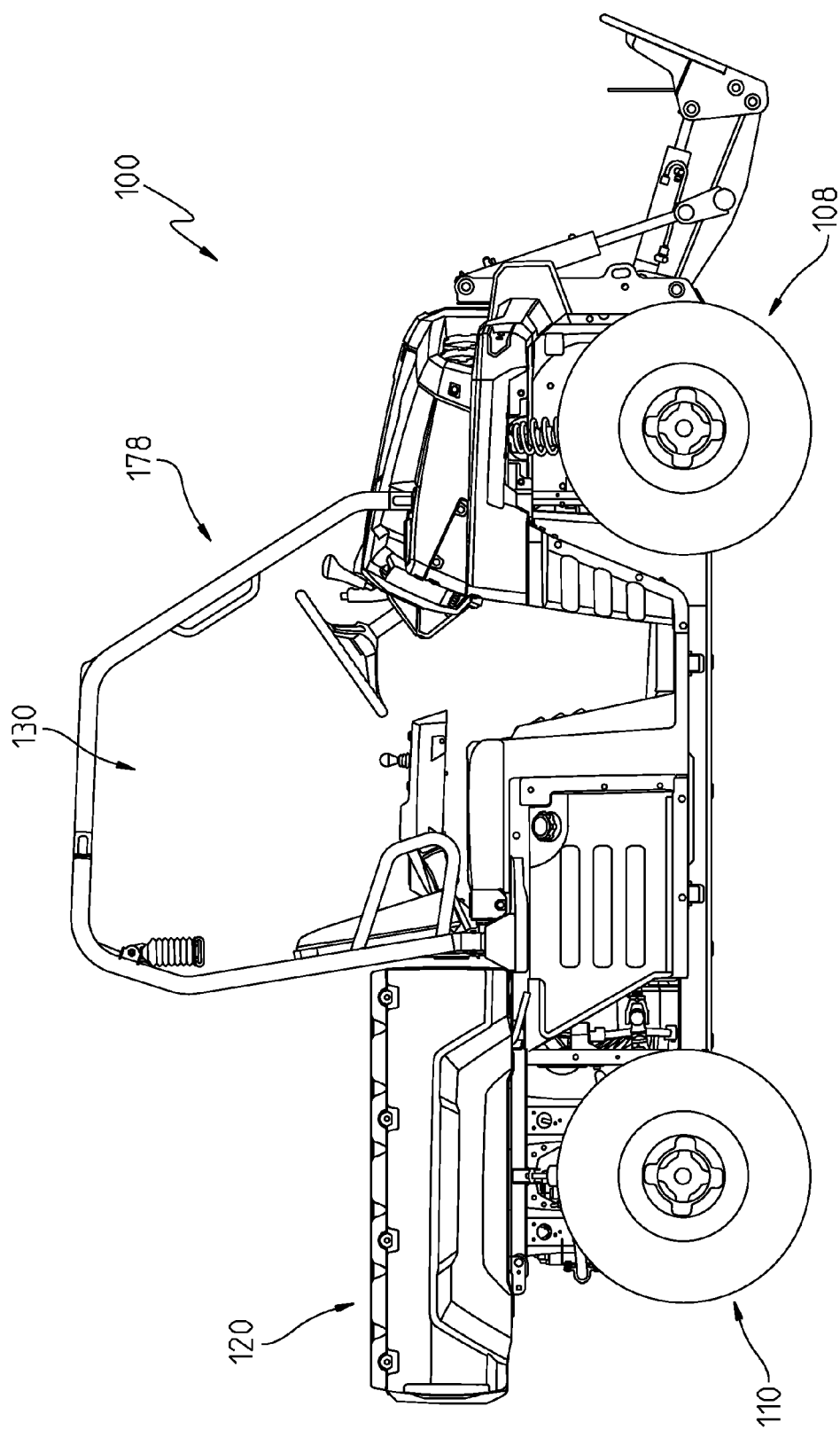
FIG. 3 illustrates a right side view of the exemplary utility vehicle of FIG. 1.
Figure 4:
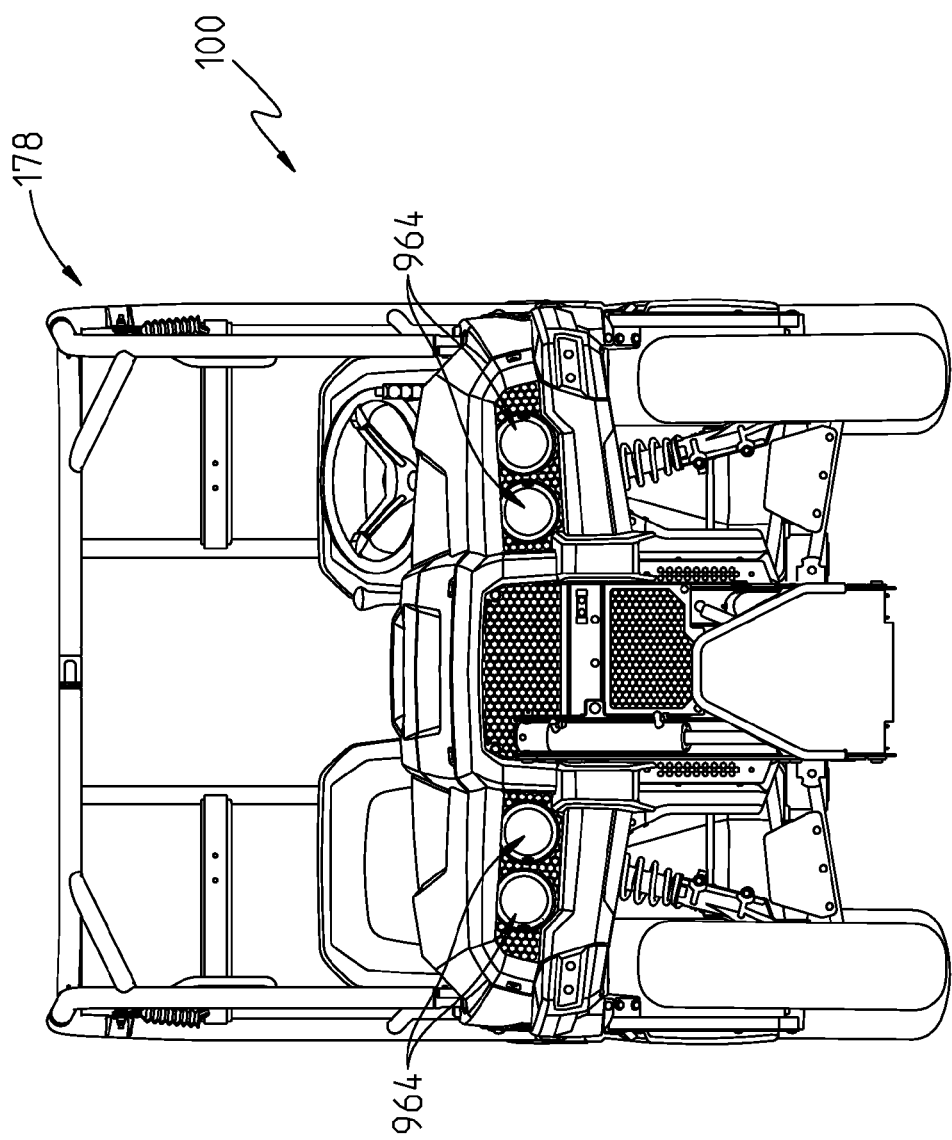
FIG. 4 illustrates a front view of the exemplary utility vehicle of FIG. 1.
Figure 5:
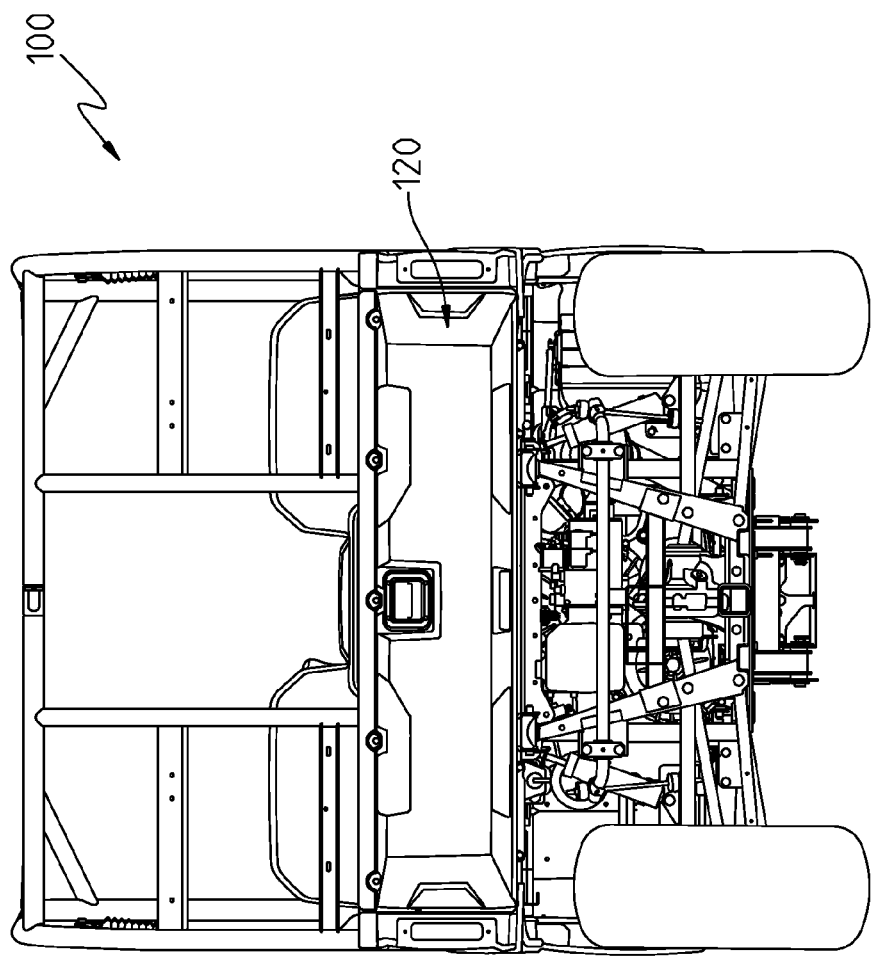
FIG. 5 illustrates a rear view of the exemplary utility vehicle of FIG. 1.
Figure 6:
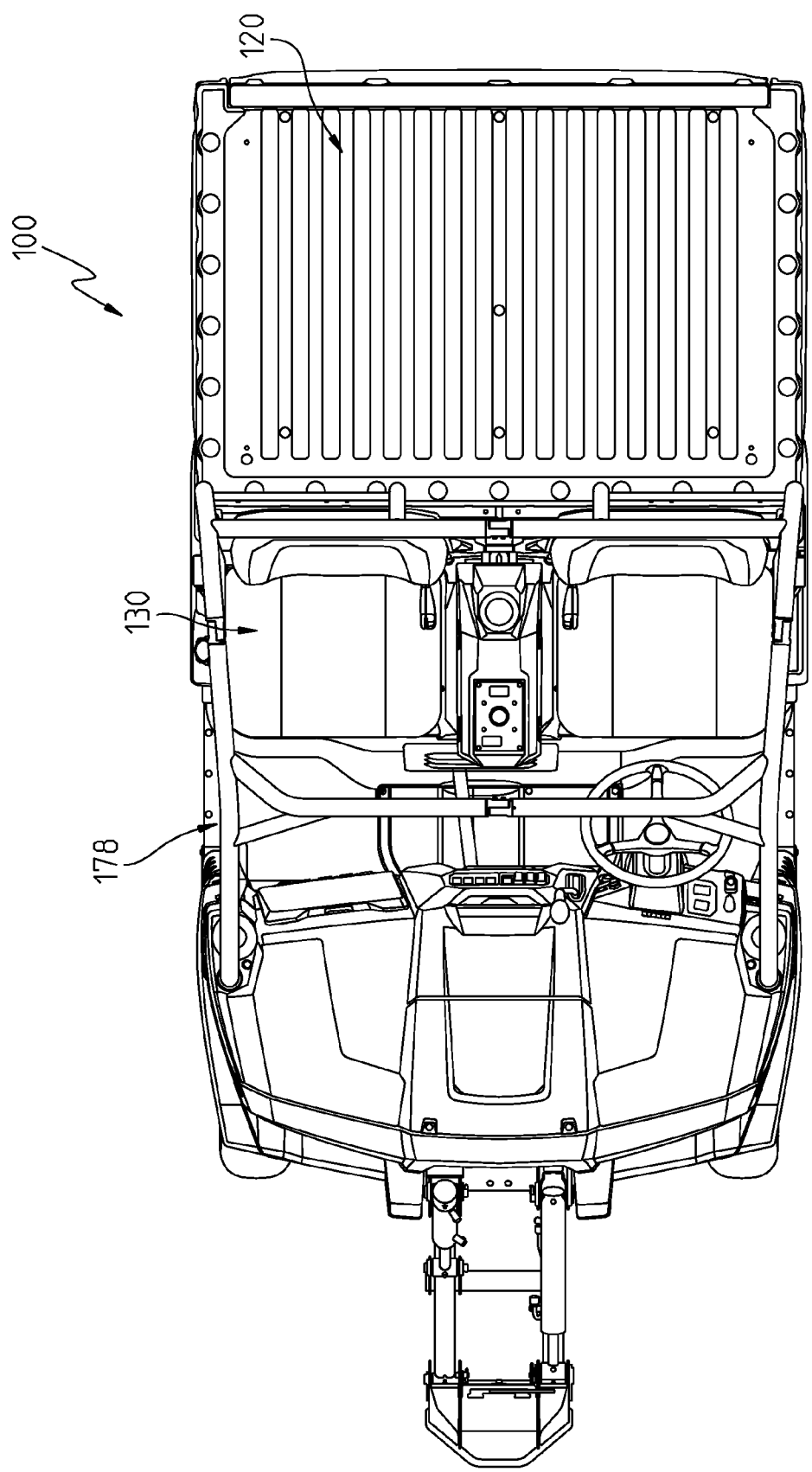
FIG. 6 illustrates a top view of the exemplary utility vehicle of FIG. 1.
Figure 7:
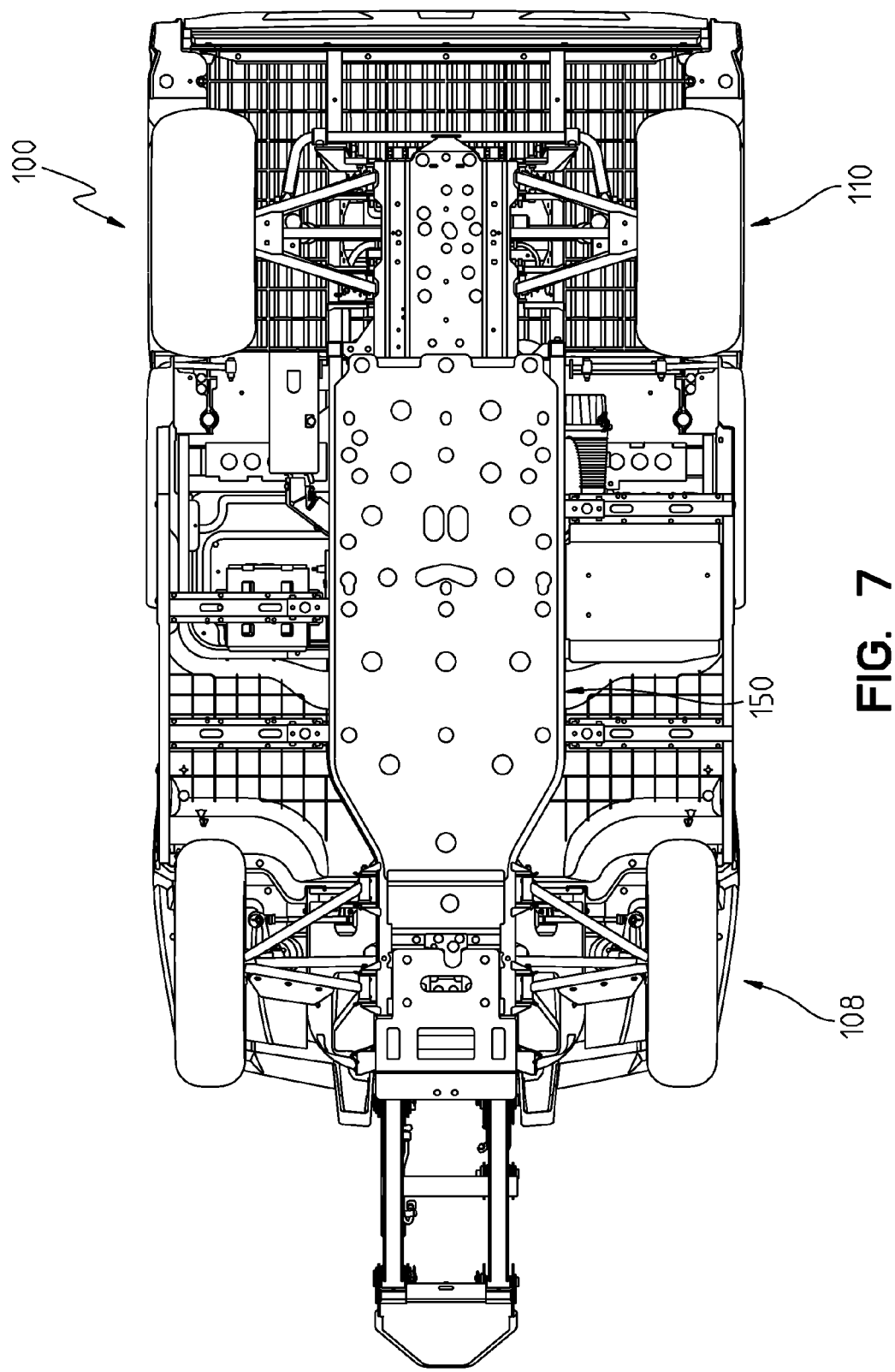
FIG. 7 illustrates a bottom view of the exemplary utility vehicle of FIG. 1.

Referring to FIG. 2, the muffler 960 of the exhaust system includes an outlet under cargo bed 120 which is forward of rear axle 110. Referring to FIG. 3, vehicle 100 includes four headlights 964. In one embodiment, headlights 964 are adjustable to direct the light up and down, as well as, left and right.

Figure 34:
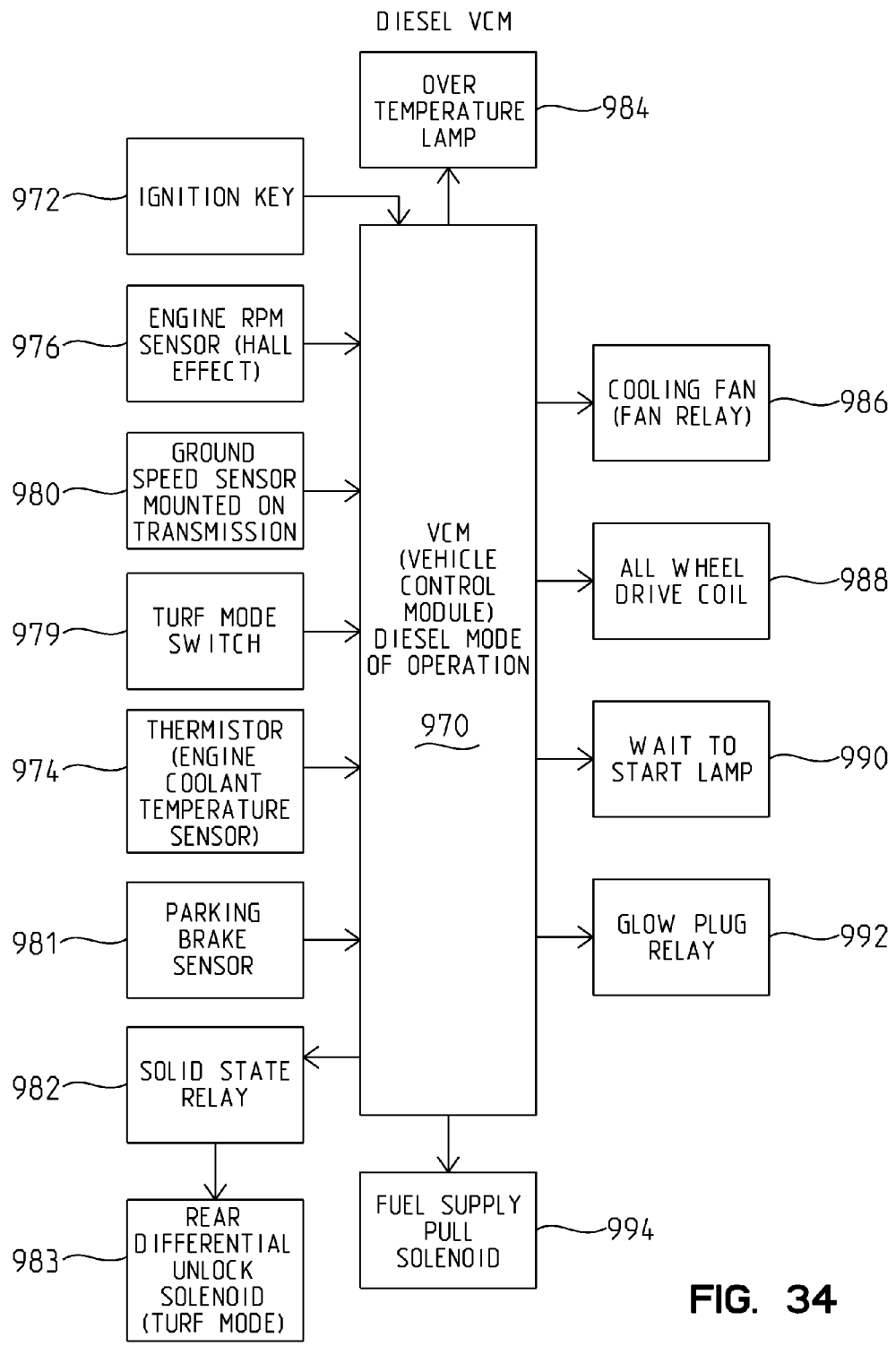
FIG. 34 illustrates a vehicle control module related to a diesel mode of operation.
Figure 35:
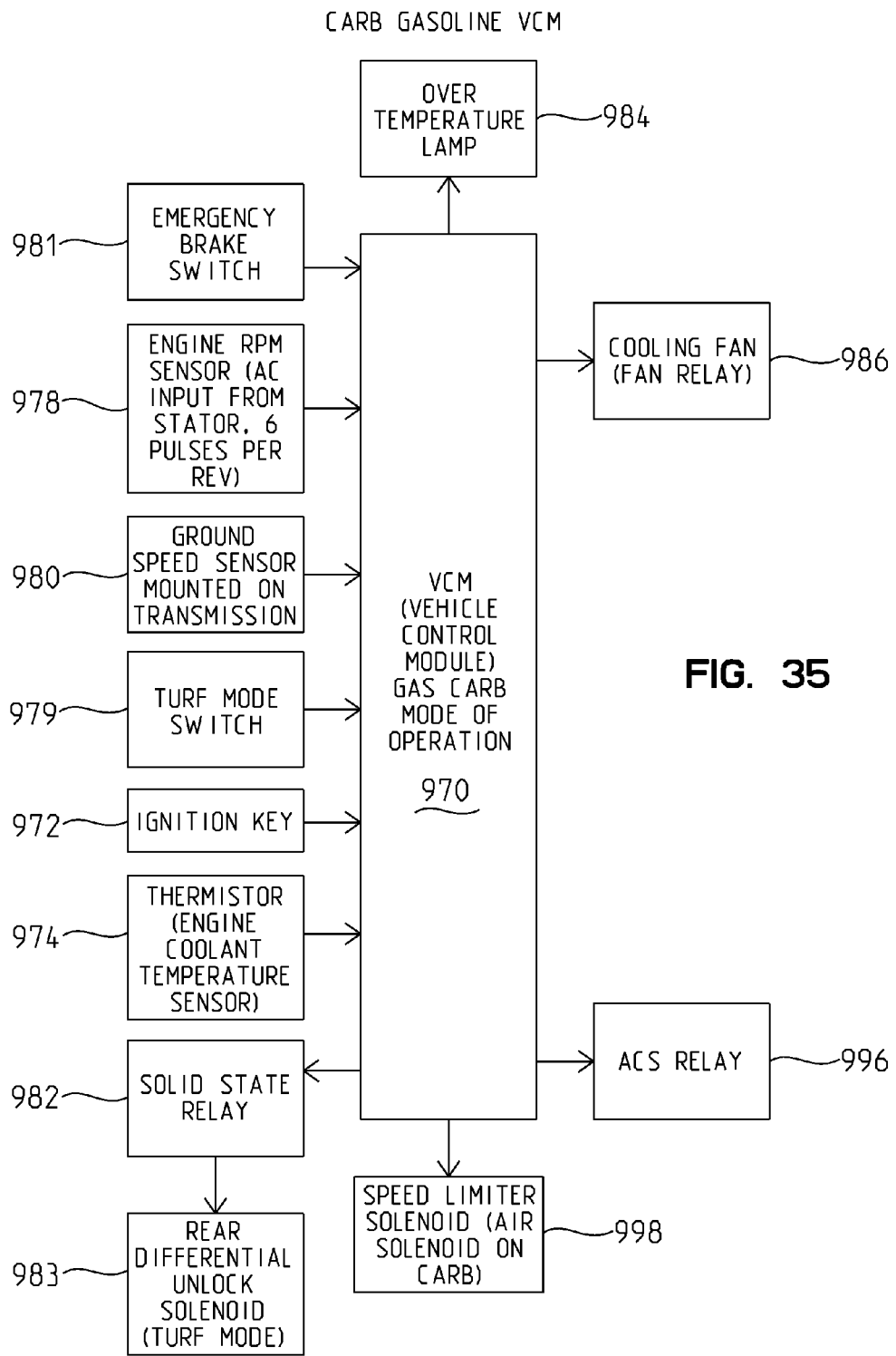
FIG. 35 illustrates a vehicle control module related to a diesel mode of operation.

Referring to FIGS. 34 and 35, a vehicle control module ("VCM") 970 is represented. Vehicle control module 970 is configured to be used with both of a gasoline based engine and diesel based engine 702. Configuration mode is sensed at startup by the vehicle control module 970. The vehicle control module 970 may be used to perform the following functions: Glow Plug relay control, Glow Plug Indicator/countdown lamp, Fuel Pull Solenoid control, Cooling fan relay control, AWD coil control, Overtemp lamp control, Alternator Controlled Switch (ACS) relay control, Rear Differential Driver Control w/PWM, Speed Limiter air Solenoid Control w/PWM. In one embodiment, vehicle control module 970 communicates with or monitors various sensors or modules through dedicated wiring. In one embodiment, vehicle control module 970 communicates with or monitors various sensors or modules through a network, such as a CAN network. The vehicle control module 970 may also store and provide diagnostic information. The vehicle control module 970 may interface with an external display and/or computer to assist with troubleshooting and system testing.

The VCM 970 monitors the Ignition Key or input 972 to determine when it is in an ON state. The VCM 970 identifies whether prime mover 700 is a diesel engine or a gasoline engine. In one embodiment, the VCM 970 utilizes a dual thermistor/identifier to determine whether the prime mover 700 is a diesel engine or a gasoline engine. The connector to the VCM 970 has three connection points relative to the thermistor 974. A first connection point is ground. A second connection point is a constant voltage when associated with a diesel engine and connected to one side of the thermistor 974 with a gasoline engine. A third connection point is a constant voltage when associated with a gasoline engine and connected to one side of the thermistor with a diesel engine. As such, by monitoring the voltage of the second connection and the third connection, VCM 970 may determine whether prime mover 700 is a diesel engine or a gasoline engine. The thermistor 974 monitors the temperature of the engine coolant for the respective diesel engine or gasoline engine.

The VCM 970 monitors the engine speed or tach of the respective diesel engine or gasoline engine. On diesel engines, the tach signal is provided by a hall effect sensor 976 on the starter ring. In one embodiment, the sensor 976 will detect 105 teeth per 1 engine revolution. On gasoline engines the tach signal is provided from an rpm sensor 978 associated with one of the stator outputs. In one embodiment, the rpm sensor 978 will detect 6 pulses per revolution.

The VCM 970 monitors a ground speed of the vehicle. In one embodiment, a Hall effect sensor 980 is provided on the transmission after the CVT. Vehicle control module 970 uses the ground speed input to control top speed of a gasoline powered vehicle. Vehicle control module 970 uses the ground speed input for all-wheel drive ("AWD") and Turf (ON—only a single ground engaging member receiving power for a given axle; OFF—power is provided to both ground engaging members). Vehicle control module 970 may have an internal pull up resistor on the line to work with Open Collector Hall Effect speed sensor.

The VCM 970 monitors a state of the parking brake of vehicle 100. A parking brake sensor 981 is provided to monitor whether the parking brake is set or not. The parking brake sensor 981 is normally open and switched to ground when the parking brake is applied. Vehicle control module 970 also checks the parking brake sensor 981 when deciding whether to permit turf mode operation or not. When the parking brake sensor 981 is grounded (parking brake applied) turf mode is deactivated so that both of the ground engaging members of rear axle 110 are locked.

The VCM 970 controls when vehicle 100 may be in a Turf Mode of operation. VCM 970 monitors an operator actuated Turf Mode switch 979 in operator area 130. An operator may request Turf Mode by actuating switch 979. When a Turf Mode is active, only a single ground engaging member receiving power for a given axle. When a Turf Mode is inactive all ground engaging members of a given axle are provided power. Vehicle control module 970 controls a solid state relay 982 to control a solenoid 983 of rear drive unit 730 to either activate or deactivate Turf Mode operation. During Turf Mode Operation, the solenoid output is powered On (driven Low) continuously for approx 2 seconds and then a PWM signal is used to maintain solenoid engagement, which limits current draw and internal heating of the solenoid. In one embodiment, turf mode engagement is limited to a ground speed of less than 10 MPH. Additional details regarding controlling one or more of a rear differential and a front differential are provided in U.S. Provisional Patent Application Ser. No. 61/187,147, titled ELECTRIC VEHICLE, filed Jun. 15, 2009, the disclosure of which is expressly incorporated by reference herein. Additional details are provided in U.S. Pat. Nos. 6,976,553; 7,220,209; and 7,600,599, the disclosures of which are expressly incorporated by reference herein.

Vehicle control module 970 also controls in a diesel powered vehicle an over temperature lamp 984 for the coolant, a cooling fan relay 986 for activating a fan on radiator 604, an AWD coil 988 located in the front differential 734 to control the engagement of the front ground engaging members, a wait to start lamp 990 which provides an indication of when to start engine 702 (allowing the engine to preheat for a given amount of time based on coolant temperature), a glow plug relay 992 which activates the glow plugs of engine 702, and a fuel supply pull solenoid 944 which is energized briefly to allow fuel to be drawn to engine 702 at startup (subsequently a second coil maintains the solenoid in an open position while the vehicle is running).

In one embodiment, the AWD coil driver in the front differential 734 will not turn on the AWD coil if the vehicle is traveling above 8 MPH. In the event that ground speed input is equal to 0 MPH (possible missing input), the engine RPM must be below 1800 RPM before allowing engagement of all wheel drive. An AWD switch may be provided in the operator space to provide control to the operator to complete or disconnect the supply or return path from the AWD coil (or AWD relay) which then allows the AWD circuit to be active or inactive based on the input state of the AWD switch and the vehicle operating conditions, such as ground speed and engine RPM. An SCR or other latching type device is used to keep the AWD circuit engaged by the VCM once it has been engaged until the operator breaks and resets the circuit by turning "Off" the AWD switch on the dash.

In one embodiment, a "Neutral" relay is included which is activated every time the gear selector unit 726 is passed through the neutral position. The relay's normally closed contacts are wired in series with the AWD coil. This allows the AWD circuit to be broken (opened) each time the vehicle's direction is changed from forward to reverse and allows the front differential to "unlock" during the direction change. This feature is useful for preventing front driveline "wedging" which can occur when the differential remains locked and a rotational direction change is made.

Vehicle control module 970 in a gas vehicle controls an over temperature lamp 984, a cooling fan relay 986, an Alternator Controlled Switch (ACS) relay 996 which powers the hour meter, the fuel pump, and a speed limiter solenoid 998 which limits the air entering a carburetor of the gasoline engine. An exemplary speed limiter system is disclosed in U.S. patent application Ser. No. 12/501,944, titled VEHICLE HAVING A CONTROL UNIT, the disclosure of which is expressly incorporated by reference herein.

Figure 33A:
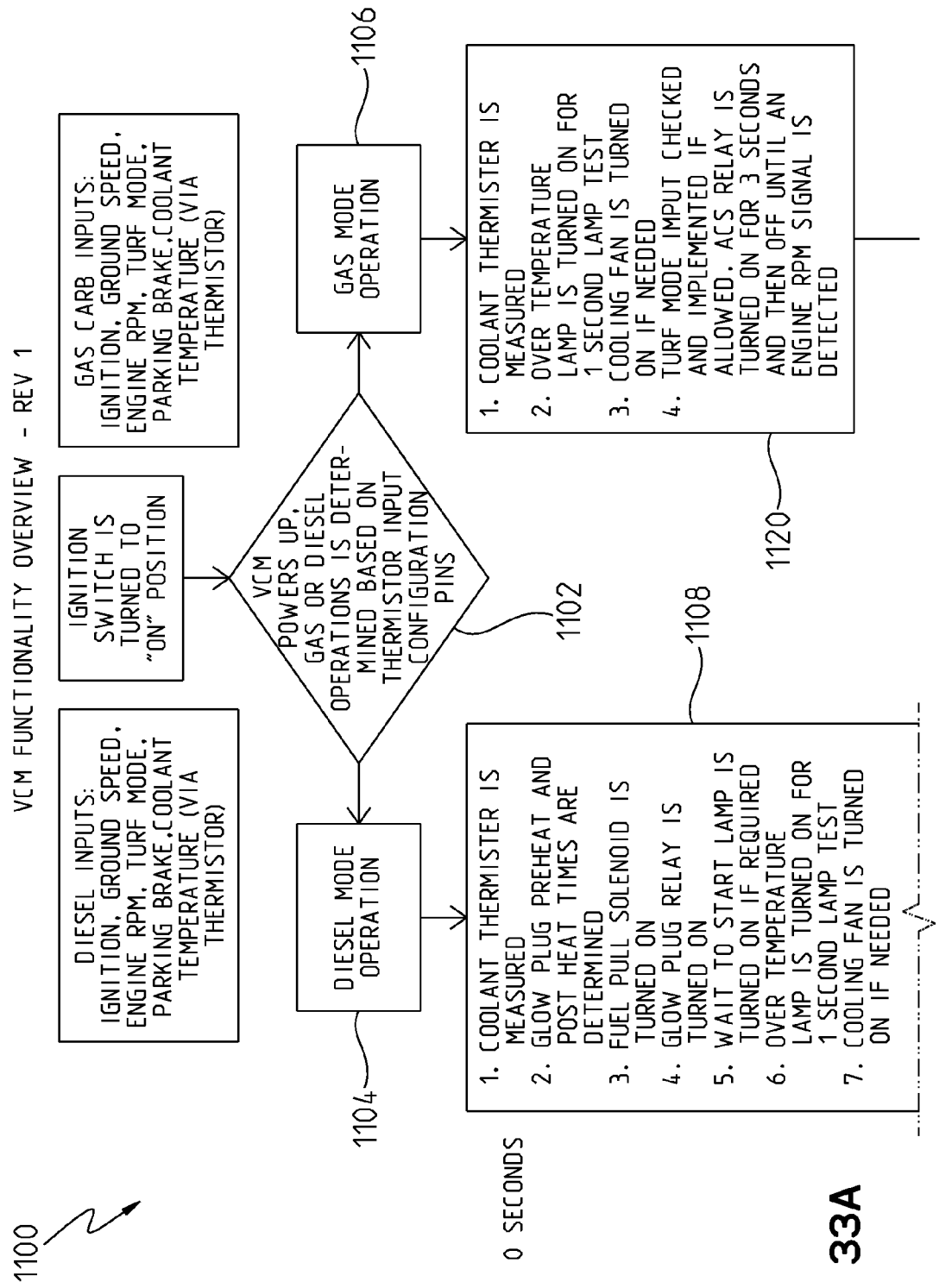
FIGS. 33A and 33B illustrate a flow chart of a processing sequence executed by a controller of the vehicle.
Figure 33B:
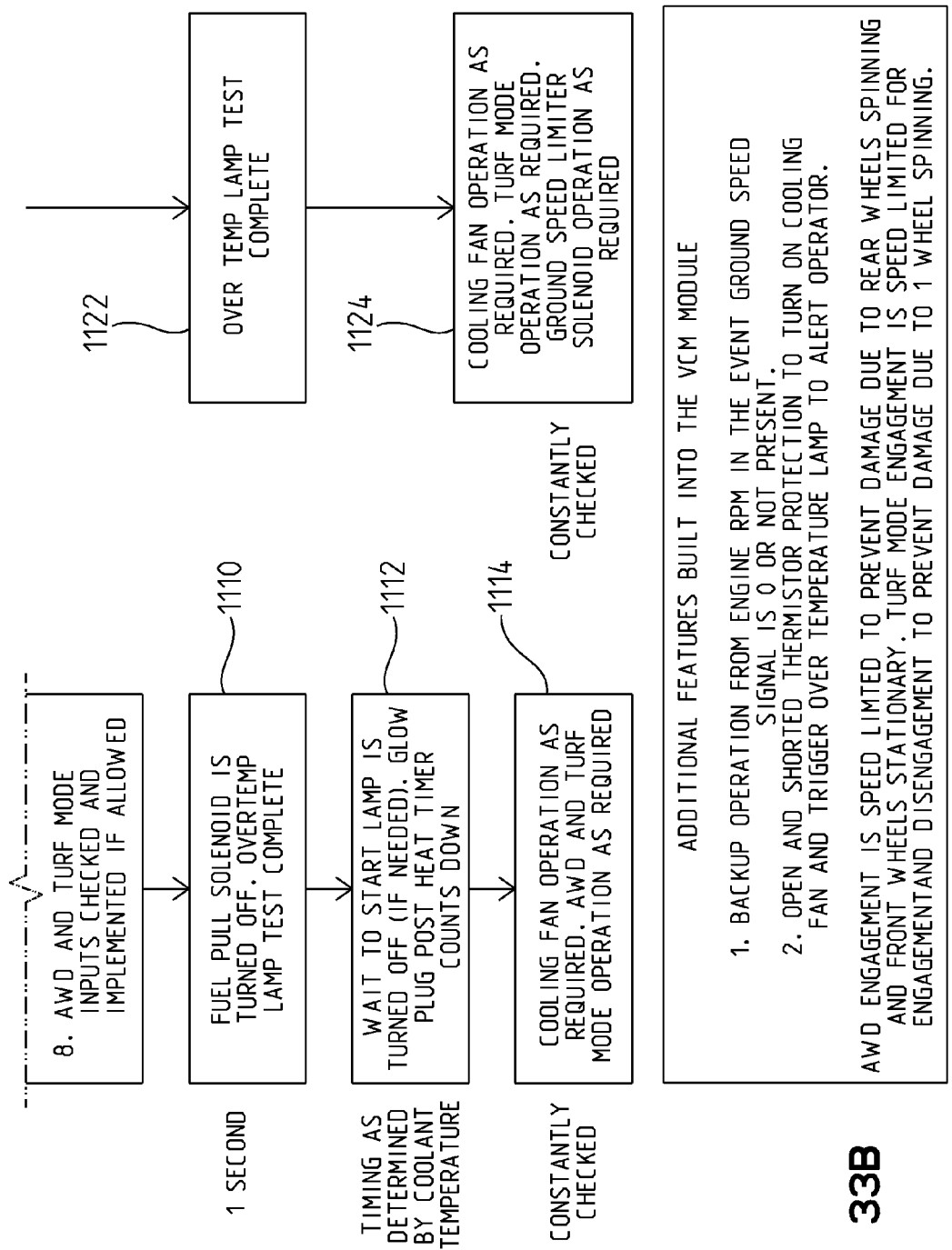

An exemplary processing sequence 1100 of vehicle control module 970 is provided in FIGS. 33A and 33B. As shown in FIG. 33A, the vehicle control module 970 at ignition on determines the type of vehicle and then undertakes the appropriate sequence, as represented by blocks 1102-1106.

In the case of the diesel mode of operation, as represented by block 1104, VCM 970 performs several operations at ignition "on" (power applied to VCM module 970). As represented in block 1108, the Thermistor resistance/temperature is checked against a lookup table to determine the appropriate glow plug "pre-start" and "post start" times. The Glow plug relay is closed, the Glow plug/Wait to start lamp in the operator area 130 would illuminate if required based on coolant temperature, the fuel solenoid pull relay is closed, the cooling fan is turned on if needed, an AWD input in the operator area 130 and the turf mode switch 979 are checked and the appropriate modes implemented if allowed, and a countdown from the "pre-start" time begins.

After a first time period, such as 1 second, the fuel solenoid pull relay releases, as represented by block 1110, but it is held open by the hold solenoid which remains active until ignition off. Upon reaching 0 on the "pre-start" timer countdown, the Glow Plug/Wait to start lamp turns off, as represented by block 1112. The glow plug relay continues to remain on for the "post-start" time, as represented by block 1112. During operation of vehicle 100, VCM 970 continues to check if cooling fan operation is required, and the allowability of the AWD and Turf Modes, if requested, as represented by block 1114.

In the case of gasoline mode of operation, as represented by block 1106, VCM 970 performs several operations at ignition "on" (power applied to VCM module 970). As represented in block 1120, the Thermistor resistance/temperature is checked, an over temperature lamp in the operator area 130 is turned on for a 1 second test lamp (as noted in block 1122), the cooling fan is turned on if needed, the turf mode switch 979 are checked and the appropriate modes implemented if allowed, and the ACS relay 996 is turned on for 3 seconds and then turned off until an engine rpm signal is detected. During operation of vehicle 100, VCM 970 continues to check if cooling fan operation is required, the allowability of the Turf Mode, if requested, and the whether the ground speed limiter solenoid should be operated, as represented by block 1124.

In one embodiment, one or more modules of vehicle 100 are a part of a network system which permits the inclusion of expansion modules for accessories or vehicle upgrades. Exemplary vehicle components and controls associated with an exemplary CAN network are disclosed in U.S. patent application Ser. No. 11/218,163, filed Sep. 1, 2005, titled CONTROLLER AREA NETWORK BASED SELF-CONFIGURING VEHICLE MANAGEMENT SYSTEM AND METHOD, U.S. patent application Ser. No. 12/475,531, filed May 31, 2008, titled VEHICLE SECURITY SYSTEM, and U.S. Provisional Patent Application Ser. No. 61/187,147, titled ELECTRIC VEHICLE, filed Jun. 15, 2009, the disclosures of which are expressly incorporated by reference herein.

In one embodiment, VCM 970 and other electrical components may be cooled by thermally coupling them to the airflow generated by or for CVT 714 or prime mover 700. Other electrical components include a voltage regulator and other electronic devices.

Figure 36:
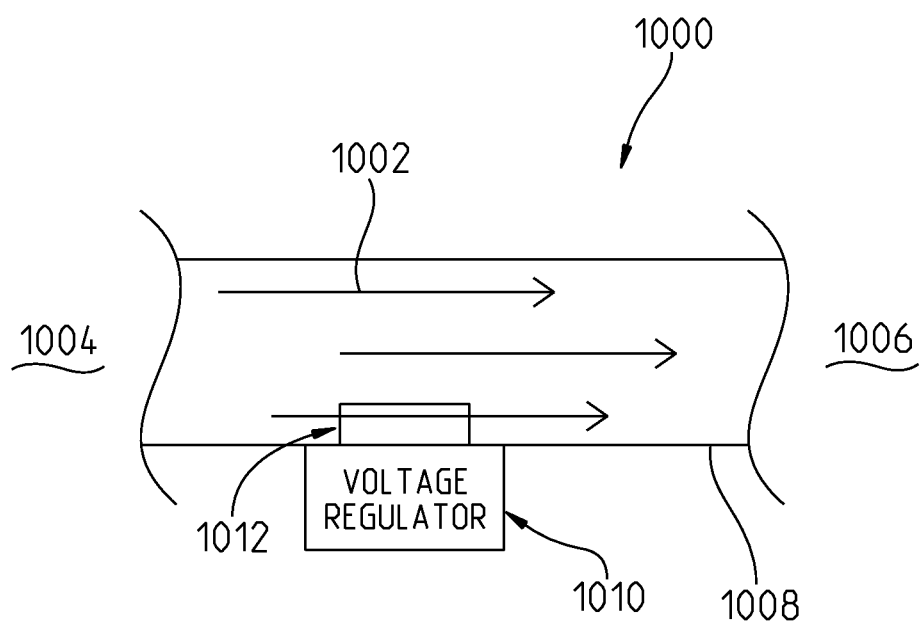
FIG. 36 illustrates an electrical component being thermally coupled to the air passing through an air conduit.

Referring to FIG. 36, a portion of an air conduit 1000 is shown. Air conduit 1000 guides or otherwise directs air 1002 from a first location 1004 towards a second location 1006. In one embodiment, air 1002 is pushed from first location 1004 towards second location 1006. In one example, a blower or other device pushes air 1002 from first location 1004 towards second location 1006. In one embodiment, air 1002 is drawn from first location 1004 towards second location 1006. In one example, a CVT 714 or an internal combustion engine, such as diesel engine 702, draws air 1002 from first location 1004 towards second location 1006.

A voltage regulator 1010 is shown in FIG. 36 adjacent to the wall 1008 of air conduit 1000. In one example, voltage regulator 1010 is coupled to air conduit 1000 and air conduit 1000 holds voltage regulator 1010 in place. In one example, voltage regulator 1010 is coupled to air conduit 1000 and voltage regulator 1010 is held by frame 150 independent of air conduit 1000. Fins 1012 or other heat transfer features of voltage regulator 1010 extend into air conduit 1000 and contact air 1002 traveling through air conduit 1000. The air removes heat from voltage regulator 1010 and cools the electrical devices of voltage regulator 1010.

Referring to FIG. 32, voltage regulator 1010 may be placed at various locations of an air intake system for diesel engine 702 or a gasoline engine. Voltage regulator 1010 may be placed in a first location 1020 of fluid conduit 642 such that fins 1012 are exposed to air passing from air intake housing 640 to airbox 644. First location 1020 is located forward of operator area 130. Voltage regulator 1010 may be placed in a second location 1022 of fluid conduit 642 such that fins 1012 are exposed to air passing from air intake housing 640 to airbox 644. Second location 1022 is located rearward of steering wheel 500. Voltage regulator 1010 may be placed in a third location 1024 of fluid conduit 646 such that fins 1012 are exposed to air passing from airbox 644 to diesel engine 702. The air 1002 is drawn through fluid conduit 642 and fluid conduit 646 due to the intake suction of diesel engine 702. Fins 1012 of voltage regulator 1010 may be placed anywhere along the length of fluid conduit 642 or fluid conduit 646, within air intake housing 640, or within airbox 644 so long as air is moved over fins 1012 of voltage regulator 1010 to cool fins 1012.

Voltage regulator 1010 may be placed at various locations of an air intake system for CVT 714. Voltage regulator 1010 may be placed in a fourth location 1026 of fluid conduit 485 such that fins 1012 are exposed to air passing from air intake housing 484 to CVT housing 722. The air is drawn through fluid conduit 485 due to the draw of the spinning drive clutch member 712 and driven clutch member 718. Fins 1012 of voltage regulator 1010 may be placed anywhere along the length of fluid conduit 485, within air intake 484, or within CVT housing 722 so long as air is moved over fins 1012 of voltage regulator 1010. Depending on the temperature of the exhaust of CVT 714, voltage regulator 1010 may be placed at various locations of the air exhaust system for CVT 714. Voltage regulator 1010 may be placed in a fifth location 1030 of air exhaust 650 such that fins 1012 are exposed to air being forced out of CVT housing 722. Fins 1012 of voltage regulator 1010 may be placed anywhere along the length of air exhaust 650 or proximate an output of air exhaust 650 so long as air is moved over fins 1012 of voltage regulator 1010.

Returning to FIG. 36, air conduit 1000 may have many different shapes. In one embodiment, air conduit 1000 is a generally cylindrically shaped member, such as portions fluid conduit 642. In one embodiment, air conduit 1000 may be formed by a hood and other body members, such as with a snowmobile. In one example, the fins 1012 are mounted protruding through a fan guard of a snowmobile to expose voltage regulator 1010 to the air generated by the CVT 714 of the snowmobile. In one embodiment, the air conduit 1000 is a part of an engine cooling system for an air cooled engine.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the seating of the operator area. The vehicle further comprising a CVT operatively coupled to the prime mover and the first ground engaging member and the second ground engaging member. The CVT transferring power from the prime mover to the first ground engaging member and the second ground engaging member. The vehicle further comprising a first suspension coupling the first ground engaging member to the frame; a second suspension coupling the second ground engaging member to the frame; and a first drive unit operatively coupled to the CVT and to the first ground engaging member and the second ground engaging member, the first drive unit transferring power from the CVT to the first ground engaging member and the second ground engaging member. The first drive unit being offset to a first side of a longitudinal axis of the vehicle.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and a prime mover supported by the frame and operatively coupled to at least the first ground engaging member of the plurality of ground engaging members to propel the vehicle. The prime mover being positioned completely rearward of a front lateral plane of the seating of the operator area. The vehicle further comprising a CVT operatively coupled to the prime mover and the first ground engaging member and the second ground engaging member. The CVT transferring power from the prime mover to the first ground engaging member and the second ground engaging member. The vehicle further comprising a first suspension coupling the first ground engaging member to the frame; a second suspension coupling the second ground engaging member to the frame; and a first drive unit operatively coupled to the CVT and to the first ground engaging member and the second ground engaging member, the first drive unit transferring power from the CVT to the first ground engaging member and the second ground engaging member. The first drive unit being offset to a first side of a longitudinal axis of the vehicle. The vehicle further comprising a first half shaft coupling the first ground engaging member to the first drive unit and a second half shaft coupling the second ground engaging member to the first drive unit. The first half shaft having a first length and the second half shaft having a second length. The second length being different than the first length.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and an assembly supported by the frame. The assembly including a prime mover operatively coupled to at least the first ground engaging member of the plurality of ground engaging members to propel the vehicle and a transmission operatively coupled to the prime mover and the first ground engaging member and the second ground engaging member. The transmission transferring power from the prime mover to the first ground engaging member and the second ground engaging member. The transmission including a CVT. The vehicle further comprising a plurality of mounts coupled to the frame and supporting the assembly to isolate the assembly relative to the frame; and a damping member coupled to the assembly, the damping member being tuned to reduce the transfer of vibration from the assembly to the frame.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and an assembly supported by the frame. The assembly including a prime mover operatively coupled to at least the first ground engaging member of the plurality of ground engaging members to propel the vehicle and a transmission operatively coupled to the prime mover and the first ground engaging member and the second ground engaging member. The transmission transferring power from the prime mover to the first ground engaging member and the second ground engaging member. The transmission including a CVT. The vehicle further comprising a plurality of mounts coupled to the frame and supporting the assembly to isolate the assembly relative to the frame; and a damping member coupled to the assembly, the damping member being tuned to reduce the transfer of vibration from the assembly to the frame. The vehicle further comprising a coupling member positioned between the prime mover and the transmission, the coupling member transferring power from the prime mover to the transmission.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and an assembly supported by the frame. The assembly including a prime mover operatively coupled to at least the first ground engaging member of the plurality of ground engaging members to propel the vehicle and a transmission operatively coupled to the prime mover and the first ground engaging member and the second ground engaging member. The transmission transferring power from the prime mover to the first ground engaging member and the second ground engaging member. The transmission including a CVT. The vehicle further comprising a plurality of mounts coupled to the frame and supporting the assembly to isolate the assembly relative to the frame; and a damping member coupled to the assembly, the damping member being tuned to reduce the transfer of vibration from the assembly to the frame. The vehicle further comprising further comprising a gearbox. The gearbox having an input shaft operatively coupled to the prime mover and an output shaft operatively coupled to a drive clutch of the CVT. The output shaft having a first rpm and the input shaft having a second rpm. The second rpm being less than the first rpm.

In one embodiment, a vehicle is provided. The vehicle comprising a plurality of ground engaging members, the plurality of ground engaging members including a first ground engaging member and a second ground engaging member; a frame supported by the plurality of ground engaging members; an operator area supported by the frame, the operator area including driver controls and seating adapted to support at least two people in a side-by-side relationship; and an assembly supported by the frame. The assembly including a prime mover operatively coupled to at least the first ground engaging member of the plurality of ground engaging members to propel the vehicle and a transmission operatively coupled to the prime mover and the first ground engaging member and the second ground engaging member. The transmission transferring power from the prime mover to the first ground engaging member and the second ground engaging member. The transmission including a CVT. The vehicle further comprising a plurality of mounts coupled to the frame and supporting the assembly to isolate the assembly relative to the frame; and a damping member coupled to the assembly, the damping member being tuned to reduce the transfer of vibration from the assembly to the frame. The prime mover is a diesel engine and the vehicle further comprising an alternator operatively coupled to a crankshaft of the prime mover through a pulley system. The pulley system being configured so that the alternator operates at least 50% charging capacity when the diesel engine is idling and operates at about 100% charging capacity when the diesel engine is operating at about 50% operating capacity.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
a plurality of ground engaging members;
a frame supported by the plurality of ground engaging members;
an operator area supported by the frame, the operator area including driver controls and seating adapted to support at least two people in a side-by-side relationship;
a diesel engine supported by the frame;
a gearbox having an input shaft and an output shaft, the input shaft being coupled to the diesel engine to receive power from the diesel engine and a rotation ratio of the output shaft of the gearbox to the input shaft of the gearbox being greater than 1;
a CVT unit having a drive clutch member coupled to the output shaft of the gearbox and a driven clutch member coupled to the drive clutch member, the driven clutch member being operatively coupled to at least one of the plurality of ground engaging members to propel the vehicle;
a rear drive unit positioned rearward of the operator area and coupled to a first ground engaging member and a second ground engaging member both positioned rearward of the operator area;
a rear drive shaft operatively coupling the rear drive and the CVT, the CVT providing power to the rear drive;
a front drive unit positioned forward of the operator area and coupled to a third ground engaging member and a fourth ground engaging member both positioned forward of the operator area;
a front drive shaft operatively coupling the front drive and the CVT, the CVT providing power to the front drive; and
a first half shaft coupling the first ground engaging member to the rear drive and a second half shaft coupling the second ground engaging member to the rear drive, the first half shaft having a first length and the second half shaft having a second length, the second length being different than the first length, wherein the rear drive is offset to a first side of a vertical vehicle centerline plane of the vehicle.

2. The vehicle of claim 1, wherein the rotation ratio of the output shaft of the gearbox to the input shaft of the gearbox is about 2.1.

3. The vehicle of claim 1, wherein a speed of the input shaft of the gearbox is in the range of about 3000 rpm to about 3600 rpm and a speed of the output shaft of the gearbox has a corresponding range of about 7200 rpm to about 8000 rpm.

4. A vehicle, comprising:
a plurality of ground engaging members;
a frame supported by the plurality of ground engaging members;
an operator area supported by the frame, the operator area including driver controls and seating adapted to support at least two people in a side-by-side relationship;
a diesel engine supported by the frame;
a gearbox having an input shaft and an output shaft, the input shaft being coupled to the diesel engine to receive power from the diesel engine and a rotation ratio of the output shaft of the gearbox to the input shaft of the gearbox being greater than 1;
a CVT unit having a drive clutch member coupled to the output shaft of the gearbox and a driven clutch member coupled to the drive clutch member, the driven clutch member being operatively coupled to at least one of the plurality of ground engaging members to propel the vehicle;
a rear drive unit positioned rearward of the operator area and coupled to a first ground engaging member and a second ground engaging member both positioned rearward of the operator area;
a rear drive shaft operatively coupling the rear drive and the CVT, the CVT providing power to the rear drive;
a front drive unit positioned forward of the operator area and coupled to a third ground engaging member and a fourth ground engaging member both positioned forward of the operator area; and
a front drive shaft operatively coupling the front drive and the CVT, the CVT providing power to the front drive, wherein the rear drive is offset to a first side of a vertical vehicle centerline plane of the vehicle and wherein the rear drive shaft and the front drive shaft are positioned on the first side of the vertical vehicle centerline plane of the vehicle and a crankshaft axis of the diesel engine is positioned on a second side of the vertical vehicle centerline plane of the vehicle.

5. A vehicle, comprising:
a plurality of ground engaging members;
a frame supported by the plurality of ground engaging members;
an operator area supported by the frame, the operator area including driver controls and seating adapted to support at least two people in a side-by-side relationship;
a diesel engine supported by the frame;
a gearbox having an input shaft and an output shaft, the input shaft being coupled to the diesel engine to receive power from the diesel engine and a rotation ratio of the output shaft of the gearbox to the input shaft of the gearbox being greater than 1;
a CVT unit having a drive clutch member coupled to the output shaft of the gearbox and a driven clutch member coupled to the drive clutch member, the driven clutch member being operatively coupled to at least one of the plurality of ground engaging members to propel the vehicle;
a rear drive unit positioned rearward of the operator area and coupled to a first ground engaging member and a second ground engaging member both positioned rearward of the operator area;
a rear drive shaft operatively coupling the rear drive and the CVT, the CVT providing power to the rear drive;
a front drive unit positioned forward of the operator area and coupled to a third ground engaging member and a fourth ground engaging member both positioned forward of the operator area;
a front drive shaft operatively coupling the front drive and the CVT, the CVT providing power to the front drive; and
a gear selector unit having an input coupled to the driven member of the CVT, a first output coupled to the front drive shaft, and a second output coupled to the rear drive shaft, the gear selector unit transferring power from the CVT to the front drive shaft and the rear drive shaft and including at least one forward gear and at least one reverse gear.

6. The vehicle of claim 5, wherein the gearbox and the gear selector unit are coupled together to maintain a distance between the input of the gear selector unit and the output shaft of the gearbox.

7. The vehicle of claim 6, wherein the gearbox and the gear selector unit are housed in a common housing, the common housing being coupled to the diesel engine and positioned rearward of the diesel engine, the CVT being positioned rearward of the common housing.

8. The vehicle of claim 1, further comprising a coupling member positioned between the diesel engine and the gearbox, the coupling member transferring power from the diesel engine to the gearbox.

9. A vehicle, comprising:
a plurality of ground engaging members;
a frame supported by the plurality of ground engaging members;
an operator area supported by the frame, the operator area including driver controls and seating adapted to support at least two people in a side-by-side relationship;
a diesel engine supported by the frame;
a gearbox having an input shaft and an output shaft, the input shaft being coupled to the diesel engine to receive power from the diesel engine and a rotation ratio of the output shaft of the gearbox to the input shaft of the gearbox being greater than 1;
a CVT unit having a drive clutch member coupled to the output shaft of the gearbox and a driven clutch member coupled to the drive clutch member, the driven clutch member being operatively coupled to at least one of the plurality of ground engaging members to propel the vehicle; and
a coupling member positioned between the diesel engine and the gearbox, the coupling member transferring power from the diesel engine to the gearbox, wherein a housing of the gearbox is secured to the diesel engine with a plurality of fasteners, the coupling member being held in place due to the securing of the housing of the gearbox to the diesel engine, the coupling member being spaced apart from the plurality of fasteners.

10. The vehicle of claim 8, wherein the coupling member includes a first plurality of coupling features and a second plurality of coupling features, the first plurality of coupling features cooperating with mating features supported by the diesel engine to couple the coupling member to the diesel engine and the second plurality of coupling features cooperating with mating features supported by the gearbox to couple the coupling member to the gearbox, one of the first plurality of coupling features and the second plurality of coupling features being located radially outward relative to the other of the first plurality of coupling features and the second plurality of coupling features.

11. The vehicle of claim 10, wherein the first plurality of coupling features are radially outwardly extending recesses and the mating features supported by the diesel engine are radially inwardly extending fingers and the second plurality of coupling features are radially inwardly extending recesses and the mating features supported by the gearbox are radially outwardly extending fingers.

12. The vehicle of claim 9, wherein the coupling member is made of a resilient material and provides torsional dampening between the diesel engine and the gearbox.

13. A vehicle, comprising:
a plurality of ground engaging members;
a frame supported by the plurality of ground engaging members;
an operator area supported by the frame, the operator area including driver controls and seating adapted to support at least two people in a side-by-side relationship;
a diesel engine supported by the frame;
a CVT unit having a drive clutch member coupled to the diesel engine and a driven clutch member coupled to the drive clutch member, the driven clutch member being operatively coupled to at least one of the plurality of ground engaging members to propel the vehicle;
an alternator supported by the frame;
an output pulley coupled to and rotatable by the diesel engine;
an input pulley coupled to the alternator and coupled to the output pulley, wherein the alternator provides at least about 50% charging capacity when the diesel engine is at idle and about 100% charging capacity when diesel engine is operating at about 50% engine capacity.

14. The vehicle of claim 13, further comprising:
a rear drive unit positioned rearward of the operator area and coupled to a first ground engaging member and a second ground engaging member both positioned rearward of the operator area;
a rear drive shaft operatively coupling the rear drive and the CVT, the CVT providing power to the rear drive;

a front drive unit positioned forward of the operator area and coupled to a third ground engaging member and a fourth ground engaging member both positioned forward of the operator area; and a front drive shaft operatively coupling the front drive and the CVT, the CVT providing power to the front drive.

15. The vehicle of claim 13, wherein the alternator provides at least about 60% charging capacity when the diesel engine is at idle.

16. The vehicle of claim 13, wherein the alternator provides at least about 70% charging capacity when the diesel engine is at idle.

17. The vehicle of claim 13, wherein the alternator provides about 34 amperes when the diesel engine is at idle and about 55 amperes when the diesel engine is operating at about 50% engine capacity.

18. The vehicle of claim 13, wherein a ratio of a diameter the output pulley to a diameter the input pulley is about 2.31 to 1.

* * * * *